United States Patent
Arakawa et al.

(10) Patent No.: US 12,296,587 B2
(45) Date of Patent: May 13, 2025

(54) PULSE GENERATOR

(71) Applicant: BROTHER KOGYO KABUSHIKI KAISHA, Nagoya (JP)

(72) Inventors: Yuta Arakawa, Nagoya (JP); Haruhisa Shirai, Kasugai (JP); Nobumasa Tanaka, Nagoya (JP); Shoji Sato, Okazaki (JP); Masahiro Hoga, Ogaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 120 days.

(21) Appl. No.: 18/307,334

(22) Filed: Apr. 26, 2023

(65) Prior Publication Data

US 2023/0347644 A1  Nov. 2, 2023

(30) Foreign Application Priority Data

Apr. 28, 2022 (JP) .................. 2022-074992
Apr. 19, 2023 (JP) .................. 2023-068659

(51) Int. Cl.
B41J 2/045  (2006.01)
H02K 11/21  (2016.01)

(52) U.S. Cl.
CPC ....... *B41J 2/04573* (2013.01); *B41J 2/04586* (2013.01); *H02K 11/21* (2016.01)

(58) Field of Classification Search
CPC .... B41J 2/04573; B41J 2/04586; H02K 11/21
See application file for complete search history.

(56) References Cited

U.S. PATENT DOCUMENTS 7,492,690 B2 * 2/2009 Yen ................. H03M 1/109
                                          369/59.21
2008/0080013 A1  4/2008 Akiyama

FOREIGN PATENT DOCUMENTS

JP       2008092340 A    4/2008

* cited by examiner

*Primary Examiner* — Thinh H Nguyen
(74) *Attorney, Agent, or Firm* — Scully, Scott, Murphy & Presser, PC

(57) ABSTRACT

A pulse generator includes: a position calculating part configured to calculate a position of a driving object, based on a detection signal of a detection signal outputting part; an adjusting amount calculating part configured to calculate at least one adjusting amount previously set so that a value of the at least one adjusting amount is periodically changed with respect to the position of the driving object; and a timing adjusting part configured to determine an output timing, at which the timing pulse is to be output, based on the at least one adjusting amount.

23 Claims, 14 Drawing Sheets

FIG. 8
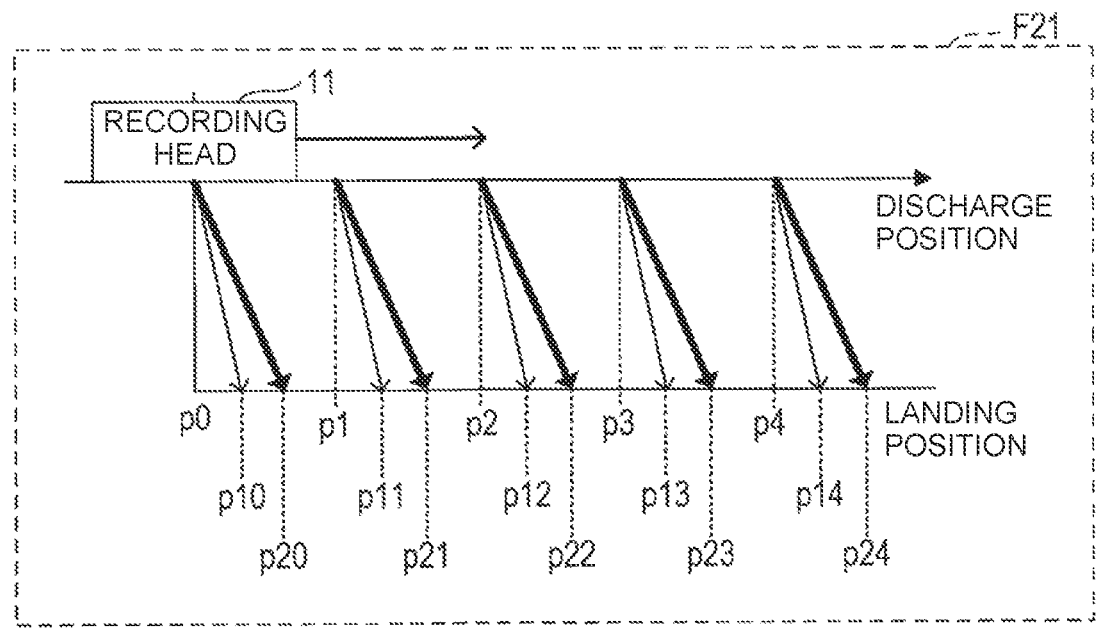
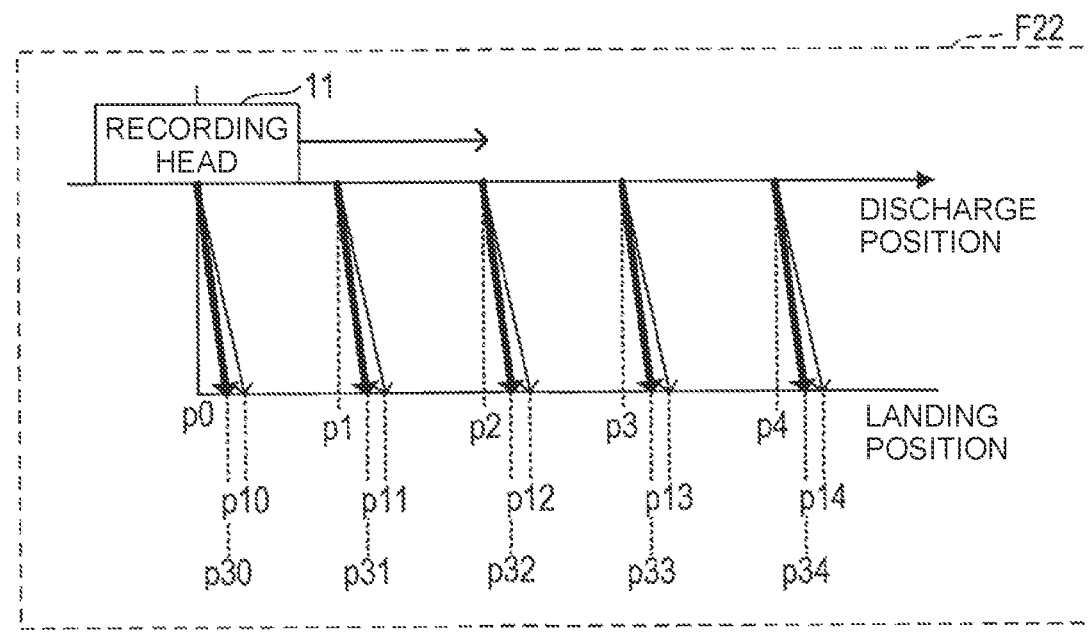

PULSE GENERATOR

REFERENCE TO RELATED APPLICATIONS

This application claims priorities from Japanese Patent Application No. 2022-074992 filed on Apr. 28, 2022 and Japanese Patent Application No. 2023-068659 filed on Apr. 19, 2023. The entire contents of the priority applications are incorporated herein by reference.

BACKGROUND ART

There is a publicly known image forming apparatus configured to use an encoder which outputs a pulse signal in accordance with movement of a carriage which moves, by driving of a motor, on a previously set moving path so as to detect the position and the moving speed of the carriage, thereby controlling an ink discharging timing (ink ejecting timing) of a recording head mounted on the carriage.

DESCRIPTION

There is such a case that any periodic printing unevenness is generated on an image formed by the above-described image forming apparatus provided with the encoder and that the quality of the image is lowered, in some cases. An object of the present disclosure is to improve the image quality of the image forming apparatus.

According to an aspect of the present disclosure, there is provided a pulse generator which is configured to generate a timing pulse based on a detection signal obtained from a detection signal outputting part configured to output the detection signal every time the detection signal outputting part detects a displacement of a predetermined displacement amount, by a detection object, which is previously set, with a second transmitting member as the detection object, the second transmitting member being configured to transmit a driving force to a first transmitting member which is configured to transmit the driving force to a driving object and to move the driving object. The pulse generator includes: a position calculating part, an adjusting amount calculating part and a timing adjusting part.

The position calculating part is configured to calculate a driving object position, which is a position of the driving object, based on the detection signal of the detection signal outputting part.

The adjusting amount calculating part is configured to calculate, based on the driving object position calculated by the position calculating part, at least one adjusting amount previously set so that a value of the at least one adjusting amount is periodically changed with respect to the driving object position.

The timing adjusting part is configured to determine an output timing, at which the timing pulse is to be output, by delaying or advancing the output timing, based on the at least one adjusting amount calculated by the adjusting amount outputting part, with respect to a reference output timing which is calculated based on the detection signal of the detection signal outputting part and which becomes to be a reference for the output timing.

The pulse generator, of the present disclosure, which is configured in such a manner is capable of suppressing the generation of a periodic printing unevenness in a case that a timing pulse, indicating a discharging timing at which a discharging apparatus moved by a conveying apparatus that is driven by a motor discharges or ejects an ink toward a sheet, is generated, thereby making it possible to improve the quality of the image of the image forming apparatus.

FIG. 8 is a view explaining deviation in a landing position in a case that a moving speed of a carriage is different from a reference speed.

FIRST EMBODIMENT

In the following, a first embodiment of the present disclosure will be explained, with reference to the drawings.

<Overall Configuration>

Figure 1:
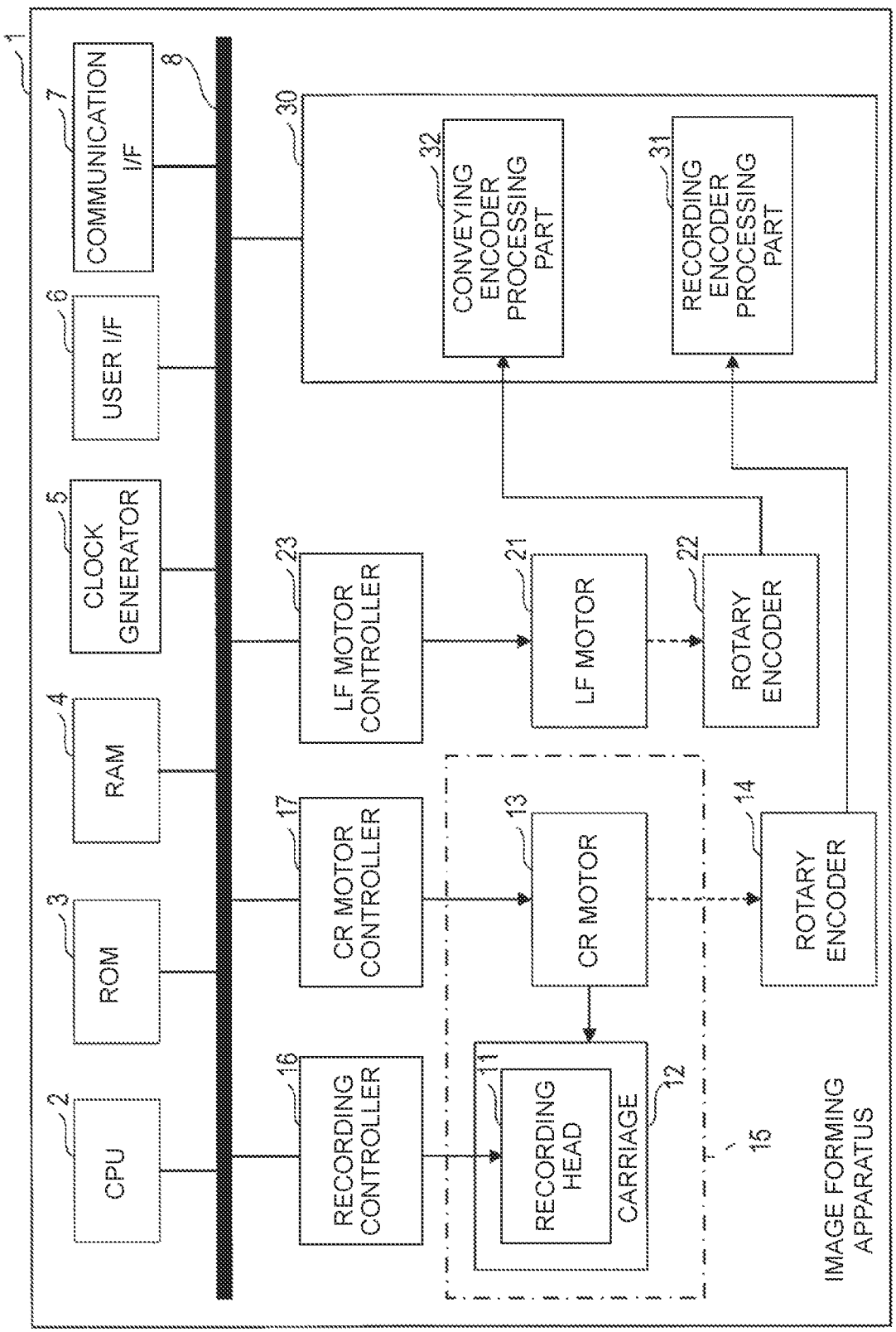
FIG. 1 is a block diagram depicting the configuration of an image forming apparatus.

An image forming apparatus 1 of the present embodiment is an ink-jet printer; as depicted in FIG. 1, the image forming apparatus 1 is provided with a recording head 11, a carriage 12, a carriage motor 13 and a rotary encoder 14.

The recording head 11, the carriage 12 and the carriage motor 13 construct a part of a printing mechanism 15.

The printing mechanism 15 is configured to receive a power from the carriage motor 13 and to thereby move the carriage 12 having the recording head 11 mounted thereon in a main scanning direction. The main scanning direction is a direction orthogonal to a sub scanning direction in which a sheet (a paper sheet) is conveyed.

The recording head 11 is a discharging head configured to discharge or eject a liquid droplet of an ink (ink liquid droplet; ink droplet), and is a so-called ink-jet head. The recording head 11 executes a discharging operation of the ink droplet, in a case that the carriage 12 moves so as to cross or traverses the sheet along the main scanning direction, to thereby form an image on the sheet. The carriage motor 13 is a direct current motor, and functions as a driving source to reciprocally move the carriage 12.

The rotary encoder 14 is an optical rotary encoder of an incremental type, and is used to measure a position in the main scanning direction and a speed of the carriage 12.

The image forming apparatus 1 further includes a line feed motor 21 and a rotary encoder 22 so as to realize conveyance of the sheet. The line feed motor 21 is a direct current motor, and functions as a driving source for rotating a conveying roller which conveys the sheet in the sub scanning direction. The rotary encoder 22 is an optical rotary encoder of the incremental type, and is used for measuring a rotation amount and a rotation speed of the conveying roller.

The image forming apparatus 1 is further provided with a CPU 2, a ROM 3, a RAM 4, a clock generator 5, a user interface 6, a communication interface 7, a bus 8, a recording controller 16, a carriage motor controller 17, a line feed motor controller 23 and an encoder processing part 30.

The CPU 2, the ROM 3, the RAM 4, the clock generator 5, the user interface 6, the communication interface 7, the recording controller 16, the carriage motor controller 17, the line feed motor controller 23 and the encoder processing part 30 are connected, via the bus 8, so that data can be inputted and output with respect to one another.

The CPU 2 is configured to integrally control the respective parts of the image forming apparatus 1. The ROM 3 stores a computer program executed by the CPU 2. The RAM 4 is used as a work space in a case that the computer program is executed by the CPU 2.

The clock generator 5 generates a clock signal of which period is sufficiently shorter than that of a pulse signal output by each of the rotary encoders 14 and 22, and outputs the clock signal to the respective parts inside the image forming apparatus 1.

The user interface 6 is provided with an operating part operable by a user and a displaying part capable of displaying various kinds of information to the user.

The communication interface 7 is an interface for performing data communication with respect to an external device or apparatus such as a personal computer, etc.

The recording controller 16 is configured to control the discharging operation of the ink droplet by the recording head 11. The carriage motor controller 17 is configured to control a conveying operation of the carriage 12 by the carriage motor 13. The line feed motor controller 23 is configured to control a conveying operation of the sheet by the line feed motor 21.

The encoder processing part 30 is provided with a recording encoder processing part 31 and a conveying encoder processing part 32.

The recording encoder processing part 31 determines a moving direction of the carriage 12 and measures a position and a moving speed of the carriage 12, based on an encoder signal inputted from the rotary encoder 14.

The conveying encoder processing part 32 determines a rotation amount and a rotation speed of the conveying roller which conveys the sheet, based on an encoder signal inputted from the rotary encoder 22.

Figure 2:
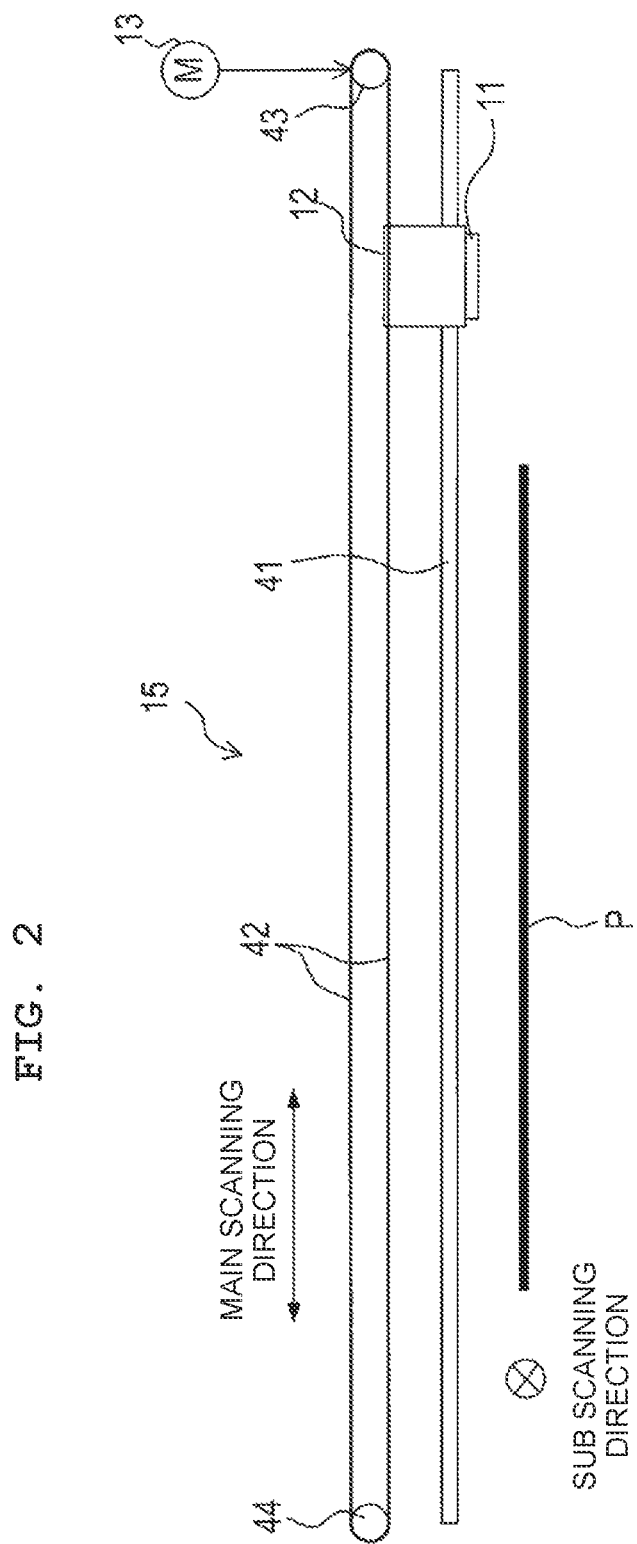
FIG. 2 is a view depicting the configuration of a printing mechanism.

As depicted in FIG. 2, the printing mechanism 15 is provided with a guide shaft 41 which extends in the main scanning direction so as to define a passage for the carriage 12. The carriage 12 is inserted into the guide shaft 41.

The carriage 12 is further connected to an endless belt 42 provided along the guide shaft 41. The endless belt 42 is wound around a driving pulley 43 arranged at one end of the guide shaft 41 and a driven pulley 44 arranged at the other end of the guide shaft 41.

The driving pulley 43 is driven and rotated by the carriage motor 13, and rotates or turn the endless belt 42. The carriage 12 moves in the main scanning direction along the guide shaft 41 by the power, of the carriage motor 13, transmitted to the carriage 12 through the rotation or turning of the endless belt 42.

The rotary encoder 14 is provided with a non-illustrated, disc-shaped encoder disc and a non-illustrated optical sensor.

The disc-shaped encoder disc is fixed to the carriage motor 13 so that the center of the disc-shaped encoder disc is arranged on a rotation shaft of the carriage motor 13. In the encoder disc, a plurality of encoder slits arranged at equal intervals on concentric circles of the encoder disc are formed.

The optical sensor is provided with a light-emitting part which emits a light, and a light-receiving part which is arranged to face the light-emitting part, with the plurality of encoder slits intervened between the light-receiving part and the light-remitting part. With this, the rotary encoder 14 outputs, as an encoder signal, a first pulse signal (hereinafter referred to as a "A-phase signal") and a second pulse signal (hereinafter referred to as a "B-phase signal") having a predetermined phase difference therebetween (in the present embodiment, 90 degrees), in accordance with the rotation of the carriage motor 13, every time the carriage motor 13 makes a rotation by a predetermined amount which has been previously set.

<Cogging of Carriage Motor>

A torque during one rotation of a motor shaft in a direct current motor is not uniform, due to the structural reason of the direct current motor, even though the driving current or the driving voltage is constant, and a periodic torque fluctuation which is a so-called cogging, occurs. Due to this, the rotation speed of the direct motor fluctuates periodically.

Since the carriage motor 13 is the direct current motor, the rotation speed of the carriage motor 13 periodically fluctuates due to the cogging.

Figure 3:
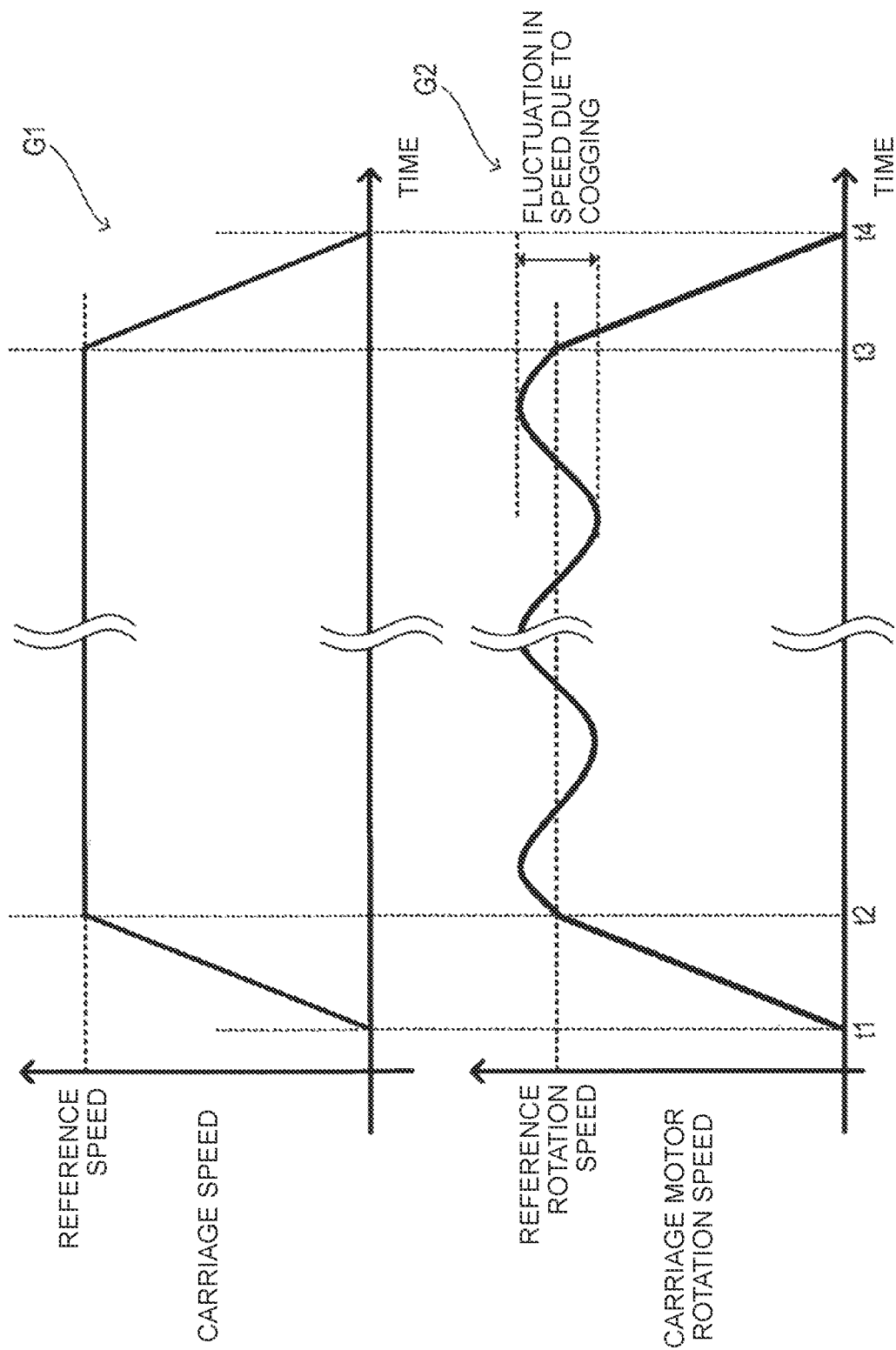
FIG. 3 is a graph indicating a temporal change of a carriage speed and a motor rotation speed.

For example, as depicted in a graph G1 of FIG. 3, the carriage 12 starts to accelerate at a time t1 from an acceleration staring position. Then, in a case that a moving speed of the carriage 12 (hereinafter referred to as a "carriage speed") reaches a reference speed at a time t2, the carriage 12 moves at a constant speed and at the reference speed, until the carriage 12 reaches a deceleration starting position.

In a case that the carriage 12 reaches the deceleration starting position at a time t3, the carriage 12 starts to decelerate. Then, the carriage speed becomes to be 0 (zero) at a time t4, and the carriage 12 stops at a stop position.

A graph G2 of FIG. 3 indicates a time change of a rotation speed of the carriage motor 13 (hereinafter referred to as a "carriage motor rotation speed") in a case that the carriage 12 moves as depicted in the graph G1.

As indicated in the graph G2, the carriage motor 13 starts rotation driving at the time t1. Then, in a case that the carriage motor rotation speed reaches a reference rotation speed at the time t2, the carriage motor 13 is controlled by the carriage motor controller 17 so that the carriage motor 13 is rotary driven at the reference rotation speed. The carriage motor rotation speed, however, fluctuates or oscillates at a cogging period due to the cogging, with the reference rotation speed as the center of fluctuation.

In a case that the carriage 12 reaches the deceleration starting position at the time t3, the carriage motor 13 starts to decelerate. Then, in a case that the carriage motor rotation speed becomes to be 0 (zero) at the time t4, and the carriage 12 stops at the stop position.

Note that the fluctuation in the carriage motor rotation speed due to the cogging (hereinafter referred to as a "cogging fluctuation") is attenuated by the endless belt 42 before being transmitted to the carriage 12 via the endless belt 42. Accordingly, the moving speed of the carriage 12 does not fluctuate or oscillate at the cogging period, and the carriage 12 moves at the constant speed and at the reference speed.

<Configuration of Recording Encoder Processing Part>

Figure 4:
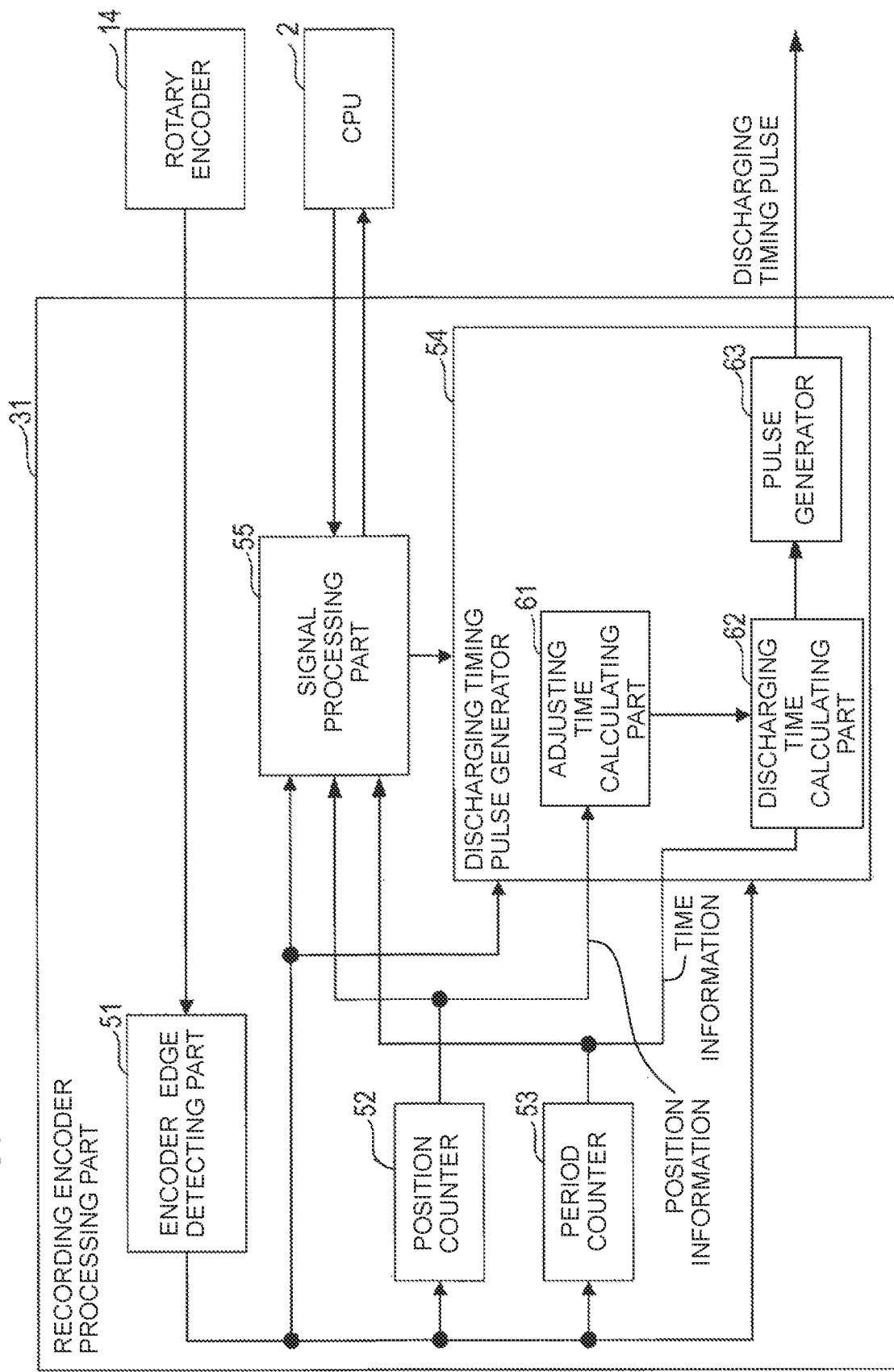
FIG. 4 is a block diagram depicting the configuration of a recording encoder processing part.

As depicted in FIG. 4, the recording encoder processing part 31 is provided with an encoder edge detecting part 51, a position counter 52, a period counter 53, a discharging timing pulse generator 54 and a signal processing part 55.

The encoder edge detecting part 51 takes in the respective phase pulse signals from the rotary encoder 14, and detects a rising edge of the A-phase signal and a rotating direction of the carriage motor 13. In a case that the encoder edge detecting part 51 detects the rising edge of the A-phase signal, the encoder edge detecting part 51 outputs an edge detection signal.

Every time the edge detection signal is inputted from the encoder edge detecting part 51 to the position counter 52, the position counter 52 increments (namely, adds 1 (one) or decrements (namely, subtracts 1 (one) with respect to) an edge number count value in accordance with the rotating direction of the carriage motor 13 (namely, the moving direction of the carriage 12) detected by the encoder edge detecting part 51. The position counter 52 outputs position information indicating the edge number count value to the discharging timing pulse generator 54 and the signal processing part 55.

Every time the edge detection signal is inputted from the encoder edge detecting part 51 to the period counter 53, the period counter 53 initializes an edge period count value. Further, every time the clock signal is inputted from the clock generator 5 to the period counter 53, the period counter 53 increments the edge period count value.

Further, every time the edge detection signal is inputted from the encoder edge detecting part 51 to the period counter 53, the period counter 53 outputs, to the discharging timing pulse generator 54 and the signal processing part 55, time information indicating an edge period count value immediately before the edge detection signal is inputted. Namely, every time the edge detection signal is inputted from the encoder edge detecting part 51 to the period counter 53, the period counter 53 measures a time since the edge detection signal has been inputted the last time and until the edge detection signal is inputted this time.

The discharging timing pulse generator 54 is provided with an adjusting time calculating part 61, a discharging time calculating part 62 and a pulse generator 63.

The adjusting time calculating part 61 calculates an adjusting time delay based on the position information inputted thereto from the position counter 52. The details of a method of calculating the adjusting time delay will be described later on.

Every time the time information is inputted from the period counter 53 to the discharging time calculating part 62, the discharging time calculating part 62 uses a time indicated by the inputted time information (namely, a predicted time Te), the adjusting time delay calculated by the adjusting time calculating part 61, and an encoder multiplication number M so as to calculate a N-th discharging time ET_N of a N-th discharging timing pulse with Formula 1. In the present embodiment, the encoder multiplication number M is 4 (four).

$$ET\_N = (N-1) \times (Te + \text{delay})/M \qquad \text{<Formula 1>}$$

After a predetermined delay time Td elapses since the input of the edge detection signal, the pulse generator 63 generates and outputs a first discharging timing pulse. Further, after the N-th discharging time ET_N elapses since the pulse generator 63 has output the first discharging timing pulse, the pulse generator 63 generates and outputs a N-th discharging timing pulse. The "N" here is an integer in a range of 2 (two) to M.

The signal processing part 55 processes a variety of kinds of signals such as the edge detection signal, the edge number count value, the edge period count value, etc., and outputs the processed signal(s) with respect to the CPU 2, as necessary. Further, the signal processing part 55 processes a variety of kinds of signals inputted thereto from the CPU 2, and outputs the processed signal(s) with respect to the respective parts in the inside of the recording encoder processing part 31.

The signal(s) inputted from the CPU 2 to the signal processing part 55 is exemplified, for example, by a signal instructing whether or not the discharging timing pulse generator 54 generates the discharging timing pulse. In the image forming apparatus 1 of the present embodiment, it is not necessarily indispensable that the discharging timing pulse is required to be generated at all times; a time at which the discharging timing pulse is required (for example, at a time of image formation) and a time at which the discharging timing pulse is not required are present in a mixed manner. Due to this, the CPU 2 instructs the discharging timing pulse generator 54, via the signal processing part 55, as to whether or not the discharging timing pulse is to be generated.

The discharging timing pulse output from the discharging timing pulse generator 54 is inputted to the recording controller 16. The recording controller 16 uses the inputted discharging timing pulse as an operation timing of the recording head 11 (namely, an ink discharging timing) and controls the operation of the recording head 11.

Next, a method of generating the discharging timing pulse will be specifically explained.

Figure 5:
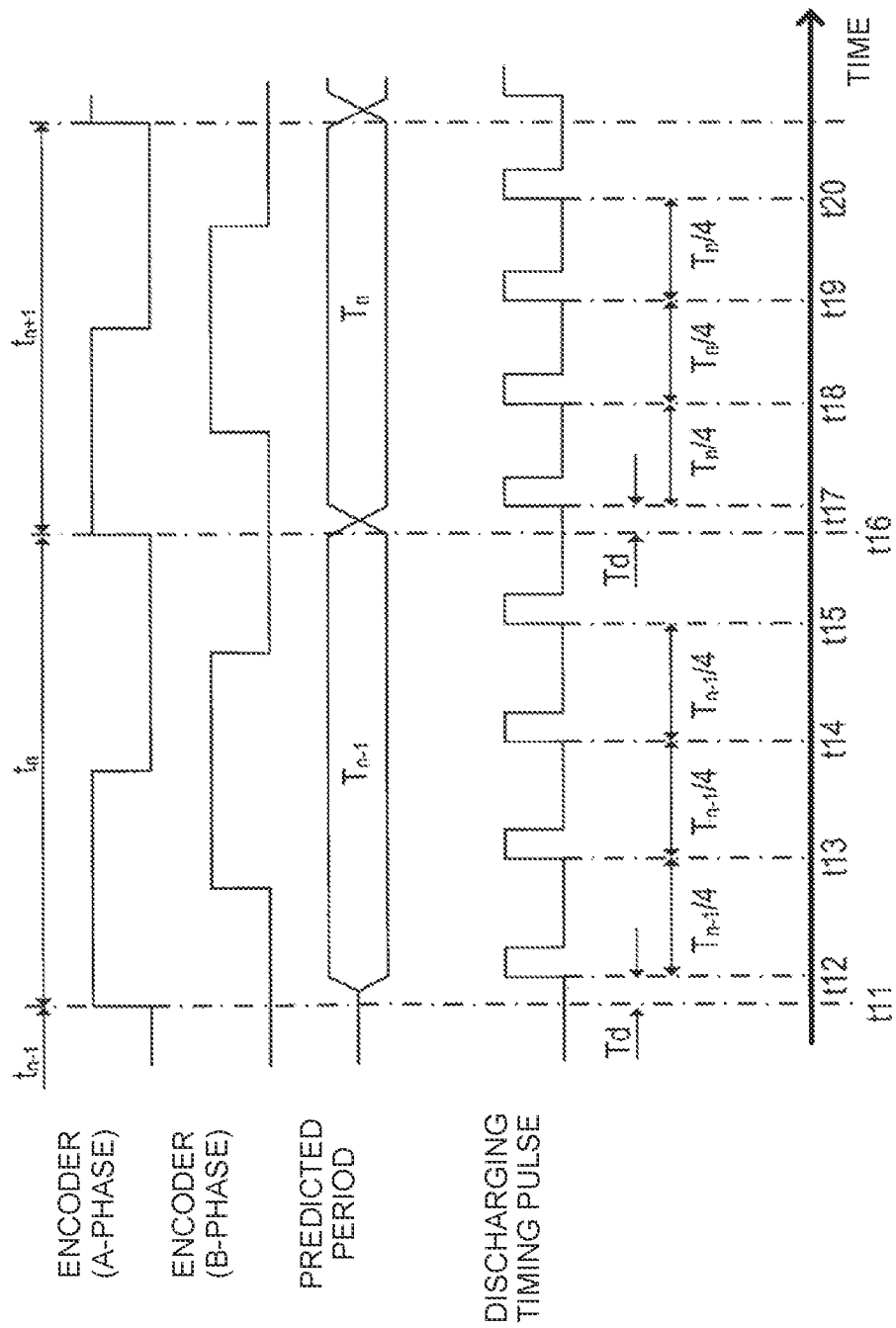
FIG. 5 is a view explaining a pulse generating method.

As depicted in FIG. 5, in a case that the rising edge of the A-phase signal is detected at a time t11, time information indicating a time tn−1 is inputted from the period counter 53 to the discharging timing pulse generator 54. The discharging timing pulse generator 54 uses the predicted time Te and the adjusting time delay so as to calculate a predicted period Tn−1. The predicted period Tn−1 is a sum of the time tn−1 and the adjusting time delay.

Further, the discharging timing pulse generator 54 generates and outputs the first discharging timing pulse at a time t12 at which the predetermined delay time Td elapses since the rising edge of the A-phase signal has been detected.

Furthermore, the discharging timing pulse generator 54 generates and outputs a second discharging timing pulse at a time t13 at which a time that is one-fourth the predicted period Tn−1 elapses since the first discharging timing pulse has been output.

Moreover, the discharging timing pulse generator 54 generates and outputs a third discharging timing pulse at a time t14 at which a time that is one-fourth the predicted period Tn−1 elapses since the second discharging timing pulse has been output.

Further, the discharging timing pulse generator 54 generates and outputs a fourth discharging timing pulse at a time t15 at which a time that is one-fourth the predicted period Tn−1 elapses since the third discharging timing pulse has been output.

Furthermore, in a case that the rising edge of the A-phase signal is detected at a time t16, time information indicating a time tn is inputted from the period counter 53 to the discharging timing pulse generator 54. The discharging timing pulse generator 54 uses the time tn and the adjusting time delay so as to calculate a predicted period Tn.

Further, the discharging timing pulse generator 54 generates and outputs the first, second, third and fourth discharging timing pulses, respectively, at a time t17, a time t18, a time t19 and a time t20 at a time interval which is one-fourth the predicted period Tn, in a similar manner with respect to the times t12 to t15.

Next, an explanation will be given about a discharging timing in a case that the carriage motor rotation speed becomes to be greater than the reference rotation speed, due to the cogging.

Figure 6:
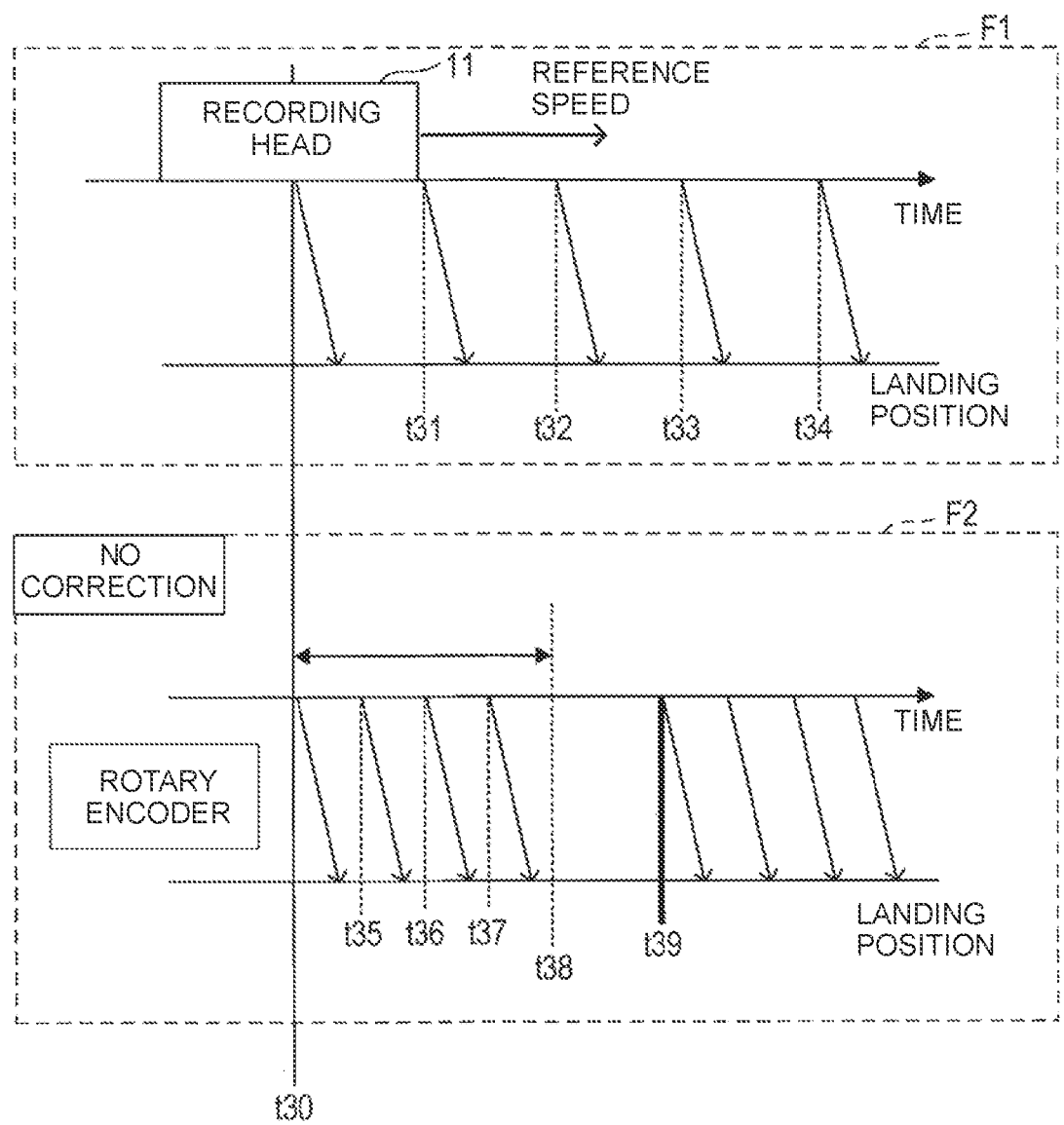
FIG. 6 is a view explaining a discharging timing in a case that a carriage motor rotation speed becomes to be greater than a reference rotation speed.

In a case that the recording head 11 is moving at the reference speed and that the carriage motor rotation speed is coincident with the reference rotation speed, it is assumed that the ink is discharged from the recording head 11 at each of a time t30, a time t31, a time t32, a time t33 and a time t34, as depicted by a view within a frame F1 of FIG. 6.

On the other hand, in a case that the recording head 11 is moving at the reference speed, that the carriage motor rotation speed becomes to be greater than the reference rotation speed and that the discharging timing pulse is generated based only on most recent time information, the ink is discharged from the recording head 11 at each of a time t30, a time t35, a time t36 and a time t37, as depicted by a view within a frame F2 of FIG. 6.

A time interval between the time t30 and the time t35 is shorter than a time interval between the time t30 and the time t31.

Note that a time t38 corresponds to a discharging timing predicted from the carriage motor rotation speed which is calculated most recently. Since the carriage motor rotation speed is greater than the reference rotation speed, the time t38 corresponding to the predicted discharging timing is earlier than the time t34 depicted by the view within the frame F1.

A time t39 depicted by the view within the frame F2 corresponds a timing at which the encoder edge detecting part 51 actually detects the edge. The reason that the timing at which the encoder edge detecting part 51 actually detects the edge is delayed with respect to the time t38 is that the carriage motor rotation speed is made slow due to the cogging.

Next, an explanation will be given about a discharging timing in a case that the carriage motor rotation speed becomes to be smaller than the reference rotation speed, due to the cogging.

Figure 7:
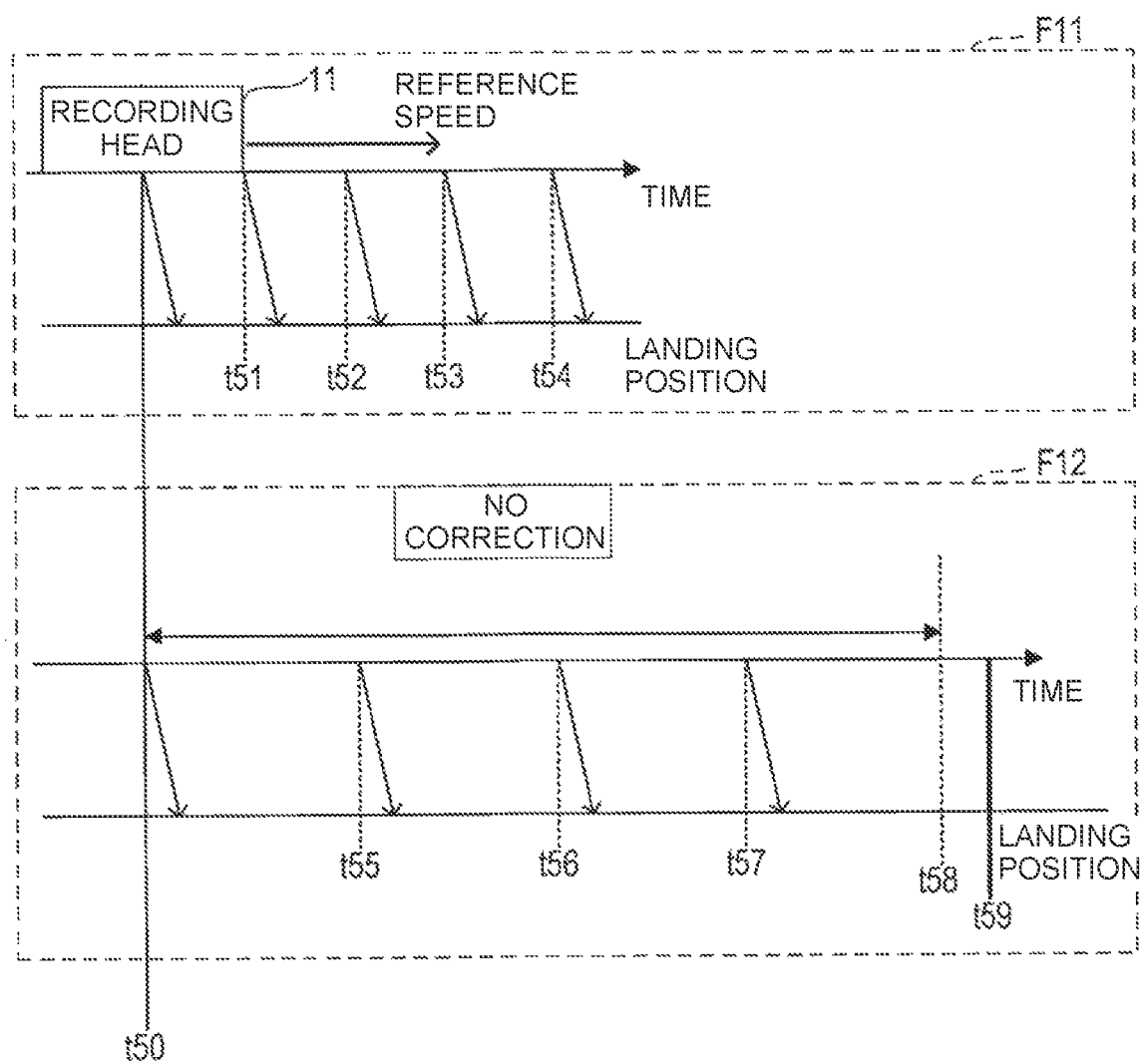
FIG. 7 is a view explaining a discharging timing in a case that the carriage motor rotation speed becomes to be smaller than the reference rotation speed.

In a case that the recording head 11 is moving at the reference speed and that the carriage motor rotation speed is coincident with the reference rotation speed, it is assumed that the ink is discharged from the recording head 11 at each of a time t50, a time t51, a time t52, a time t53 and a time t54, as depicted by a view within a frame F11 of FIG. 7.

Note that the time t54 corresponds to a discharging timing predicted from a carriage motor rotation speed which is calculated most recently. Since the recording head 11 is moving at the reference speed and the carriage motor rotation speed is coincident with the reference rotation speed, the ink is discharged at the time t54 which is coincident with the predicted discharging timing.

On the other hand, in a case that the recording head 11 is moving at the reference speed, that the carriage motor rotation speed becomes to be smaller than the reference rotation speed and that the discharging timing pulse is generated based only on the most recent time information, the ink is discharged from the recording head 11 at each of a time t50, a time t55, a time t56 and a time t57, as depicted by a view within a frame F12 of FIG. 7.

A time interval between the time t50 and the time t55 is longer than a time interval between the time t50 and the time t51.

Note that a time t58 corresponds to a discharging timing predicted from a carriage motor rotation speed which is calculated most recently. Since the carriage motor rotation speed is smaller than the reference rotation speed, the time t58 corresponding to the predicted discharging timing is later than the time t54 depicted by the view within the frame F11 of FIG. 7.

A time t59 depicted by the view within the frame F12 corresponds a timing at which the encoder edge detecting part 51 actually detects the edge. The reason that the timing at which the encoder edge detecting part 51 actually detects the edge is later than the time t58 is that the carriage motor rotation speed becomes to be slow due to the cogging.

Next, an explanation will be made regarding a deviation in a landing position in a case, for example, that the carriage motor rotation speed fluctuates periodically due to any deviation in the coaxiality (coincidence) of the encoder and that this fluctuation is actually transmitted to the carriage 12. The term "deviation in the coaxiality of the encoder" means that the central axis of the encoder disc of the rotary encoder 14 and the rotation shaft of the carriage motor 13 are deviated (misaligned) from each other.

In a case that the recording head 11 is moving at the reference speed, as depicted by a view within a frame F21 of FIG. 8, the recording head 11 discharges the ink at discharge positions P0, P1, P2, P3 and P4 in an order starting from a discharge position which is included in the discharge positions P0, P1, P2, P3 and P4 and of which discharging timing is the earliest.

The inks (ink droplets) which are discharged, respectively at the discharge positions P0, P1, P2, P3 and P4 reach, respectively, landing positions P10, P11, P12, P13 and P14 on the sheet.

Further, in a case that the recording head 11 is moving faster than the reference speed, the discharging timing is adjusted, in accordance with the moving speed of the recording head 11, to be coincident with the discharge positions in a case that the recording head 11 is moving at the reference speed, and the recording head 11 discharges the ink droplets, respectively, at the discharge positions P0, P1, P2, P3 and P4 in the order starting from the discharge position which is included in the discharge positions P0, P1, P2, P3 and P4 of which discharging timing is the earliest.

However, since the recording head 11 is moving faster than the reference speed, a moving speed of the ink (ink droplet) in a case that the recording head 11 discharges the ink (ink droplet) also becomes faster than the reference speed. Due to this, the ink droplets discharged, respectively, at the discharge positions P0, P1, P2, P3 and P4 reach, respectively, landing positions P20, P21, P22, P23 and P24 on the sheet.

The landing positions P20, P21, P22, P23 and P24 are farther, respectively, than the landing positions P10, P11, P12, P13 and P14 with the discharge positions P0, P1, P2, P3 and P4 as the starting points thereof, respectively. Due to this, in the case that the recording head 11 is moving faster than the reference speed, it is necessary to make the discharging timing to be faster than that in the case that the recording head 11 is moving at the reference speed.

On the other hand, in a case that the recording head 11 is moving slower than the reference speed, as depicted by the view within the frame F22 of FIG. 8, the discharging timing is adjusted, in accordance with the moving speed of the recording head 11, to be coincident with the discharge position in the case that the recording head 11 is moving at the reference speed, and the recording head 11 discharges the ink droplets, respectively at the discharge positions P0, P1, P2, P3 and P4 in the order starting from the discharge position which is included in the discharge positions P0, P1, P2, P3 and P4 and of which discharging timing is the earliest.

However, since the recording head 11 is moving slower than the reference speed, a moving speed of the ink (ink droplet) in a case that the recording head 11 discharges the ink (ink droplet) also becomes slower than the reference speed. Due to this, the ink droplets discharged, respectively, at the discharge positions P0, P1, P2, P3 and P4 reach, respectively, landing positions P30, P31, P32, P33 and P34 on the sheet.

The landing positions P30, P31, P32, P33 and P34 are nearer, respectively, than the landing positions P10, P11, P12, P13 and P14 with the discharge positions P0, P1, P2, P3 and P4 as the starting points thereof, respectively. Due to this, in the case that the recording head 11 is moving slower than the reference speed, it is necessary to make the discharging timing to be slower than that in the case that the recording head 11 is moving at the reference speed.

Next, an explanation will be given about a method by which the adjusting time calculating part 61 calculates the adjusting time delay.

The adjusting time calculating part 61 calculates the adjusting time delay by Formula 2 and Formula 3. In Formula 2, "n" is an integer which is not less than 1 (one). In Formula 2, "a1, a2, a3 ... an" are each a coefficient. In Formula 3, "i" is an integer not more than "n". In Formula 3, "N" is a number of the rotation of the carriage motor 13, and is an integer not less than 0 (zero).

$$\text{delay} = a1 d1 + a2 d2 + a3 d3 + \ldots + an\, dn \qquad \text{<Formula 2>}$$

$$di = Ai\, \sin(2\pi(X - N \times Pi + Xsi)/Pi) \qquad \text{<Formula 3>}$$

Figure 9:
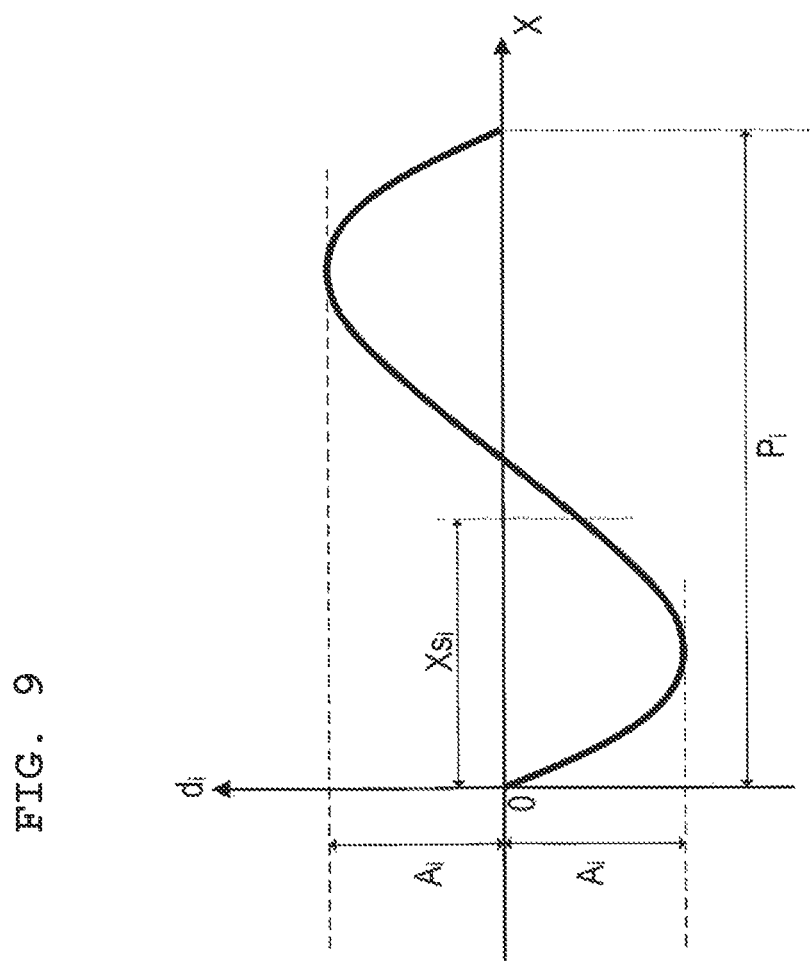
FIG. 9 is a view depicting a sine function for calculating an adjusting time.

As depicted in FIG. 9, a i-th adjusting time di is represented by a sine function which oscillates at an amplitude Ai and at a period Pi, with a position X of the carriage 12 (hereinafter referred to as a "carriage position X") as a variable. In Formula 3, "Xsi" is an initial position of the carriage 12.

In the present embodiment, for example, a period P1 of a first adjusting time d1 is set to be 22 mm, a period P2 of a second adjusting time d2 is set to be 2.2 mm, a period P3 of a third adjusting time d3 is set to be 1 mm, a period P4 of a fourth adjusting time d4 is set to be 4.4 mm and a period P5 of a fifth adjusting time d5 is set to be (37.7+α) mm.

The period P1 of the first adjusting time d1 corresponds to a distance by which the carriage 12 moves (is moved) by one rotation of the carriage motor 13. Namely, the first adjusting time d1 is, for example, a time for adjusting a periodical fluctuation (variation) in the carriage motor rotation speed due to the deviation in the coaxiality of the encoder.

The period P2 of the second adjusting time d2 corresponds to a cogging distance. The cogging distance is a value obtained by dividing the distance by which the carriage 12 is moved by one rotation of the carriage motor 13 with a product of a number (quantity) of a magnet of a stator of the carriage motor 13 and a division number by which a rotor of the carriage motor 13 is divided.

For example, it is assumed that the number of the magnet of the stator of the carriage motor 13 is "5" and the division number of the rotor of the carriage motor 13 is "2". Note that in a case that the rotor is constructed of one N-pole and one S-pole, the division number of the rotor is "2". The cogging distance in this case is: 22/(2×5)=2.2 [mm].

The period P3 of the third adjusting time d3 corresponds to a belt pitch of the endless belt 42. The belt pitch is an interval in arrangement of a plurality of teeth formed at equal intervals along a circumferential direction of the endless belt 42.

The period P4 of the fourth adjusting time d4 corresponds to a distance by which the carriage 12 is moved by a rotation made by the carriage motor only at an angle corresponding to an interval in arrangement of the magnets of the stator. In a case that the number of the magnet of the stator of the carriage motor 13 is "5", the above-described distance is: 22/5=4.4 [mm].

The period P5 of the fifth adjusting time d5 corresponds to a distance by which the carriage 12 is moved by one rotation made by the driven pulley 44 in a case that the central axis of the driven pulley 44 and the rotation shaft of the driven pulley 44 are deviated (misaligned) from each other. In the present embodiment, a circumferential length of the driven pulley 44 is 37.7 mm. Namely, the period P5 becomes to be longer than 37.7 [mm] by α [mm], due to the deviation in the axis and shaft in the driven pulley 44.

In a case that a plurality of pieces of the image forming apparatus 1 is produced, there is such a possibility that the initial position Xsi (i=1 to n) of the carriage 12 might vary or fluctuate in each of the plurality of image forming apparatuses 1, and thus the initial position Xsi is set with respect to each of the plurality of image forming apparatuses 1.

Technical Effects

The recording encoder processing part 31 configured as described above generates the discharging timing pulse based on the encoder signal obtained from the rotary encoder 14 configured to output the encoder signal every time the carriage 12 is moved at the predetermined amount which has been previously set.

The recording encoder processing part 31 is provided with the position counter 52, the adjusting time calculating part 61 and the discharging time calculating part 62.

The position counter 52 is configured to calculate a position of the carriage 12 (hereinafter referred to as a "carriage position"), based on the encoder signal from the rotary encoder 14.

The adjusting time calculating part 61 is configured to calculate, based on the carriage position calculated by the position counter 52, the first to fifth adjusting times d1 to d5 each of which is previously set so that the value thereof periodically changes with respect to the carriage position.

The discharging time calculating part 62 is configured to correct the output timing, at which the discharging timing pulse is to be output, based on the first to fifth adjusting times d1 to d5 calculated by the adjusting time calculating part 61 to thereby determine the output timing.

The recording encoder processing part 31 configured in such a manner is capable of suppressing the generation of the periodic printing unevenness in a case that the timing pulse, indicating the discharging timing at which the recording head 11 that is moved by the carriage 12 driven by the carriage motor 13 discharges the ink toward the sheet, thereby making it possible to improve the quality of the image of the image forming apparatus 1.

Each of the first to fifth adjusting times d1 to d5 is set as a function in which the carriage position X is a variable.

Each of the first to fifth adjusting times d1 to d5 is configured to be capable of setting, for each of the image forming apparatuses 1 each having the recording encoder processing part 31 mounted thereon, a value of each of the first to fifth adjusting times d1 to d5 in a case that the carriage 12 is positioned at one of the initial positions Xs1 to Xs5 which are previously set. With this, the recording encoder processing part 31 is capable of calculating the first to fifth adjusting times d1 to d5 which are appropriate for each of the image forming apparatuses 1.

The discharging timing calculating part 62 determines the output timing by correcting the output timing based on the adjusting time delay which is calculated by linearly coupling of the first to fifth adjusting times d1 to d5. The recording encoder processing part 31 configured in such a manner is capable of suppressing the generation of the printing unevenness due to a plurality of periodic fluctuations, thereby making it possible to improve the quality of the image of the image forming apparatus 1.

The recording encoder processing part 31 is configured to set at least one of the coefficients a1 to a5 to be 0 (zero) so that the recording encoder processing part 31 is capable of selecting adjusting times, of the first to fifth adjusting times d1 to d5, which are linearly coupled. The recording encoder processing part 31 configured in such a manner is capable of selecting adjusting times, of the first to fifth adjusting times d1 to d5, which are linearly coupled and which are necessary for suppressing the periodic printing unevenness.

The period P1 of the first adjusting time d1 corresponds to the distance by which the carriage 12 is moved by one rotation of the carriage motor 13. The recording encoder processing part 31 configured in such a manner is capable of suppressing the generation of a printing unevenness corresponding to the rotational period of the carriage motor 13.

The period P2 of the second adjusting time d2 corresponds to the cogging period of the carriage motor 13 which drives the carriage 12. The recording encoder processing part 31 configured in such a manner is capable of suppressing the generation of a printing unevenness due to the cogging of the carriage motor 13.

In the embodiment as explained above, the recording encoder processing part 31 corresponds to a "pulse generator", the carriage 12 corresponds to a "driving object", the encoder signal corresponds to a "detection signal", the rotary encoder 14 corresponds to a "detection signal outputting part" and the discharging timing pulse corresponds to a "timing pulse".

Further, the position counter 52 corresponds to a "position calculating part", the adjusting time calculating part 61 corresponds to an "adjusting time calculating part", the first to fifth adjusting times d1 to d5 correspond to "at least one adjusting amount" and the discharging time calculating part 62 corresponds to a "timing correcting part".

Furthermore, the distance by which the carriage 12 is moved by one rotation made by the carriage motor 13 corresponds to a "driving amount required for the motor to make one rotation", the recording head 11 corresponds to a "discharging apparatus" and the carriage 12 corresponds to a "conveying apparatus".

Second Embodiment

In the following, a second embodiment of the present disclosure will be explained, together with the drawing. Note that in the second embodiment, a part different from that of the first embodiment will be explained. A configuration of the second embodiment which is common to that of the first embodiment is designated by the same reference numeral.

An image forming apparatus 1 of the second embodiment is different from that of the first embodiment in view of that the configuration of the discharging timing pulse generator 54 is changed.

Figure 10:
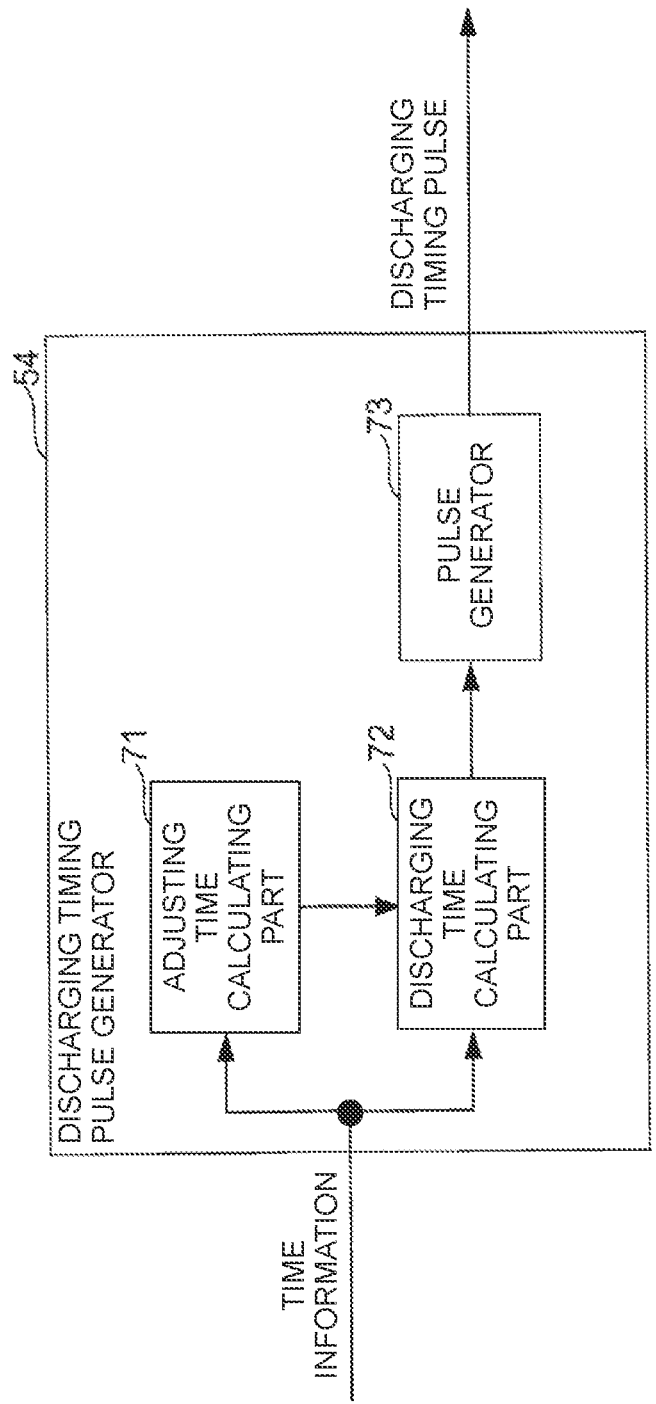
FIG. 10 is a block diagram depicting the configuration of a discharging timing pulse generator.

As depicted in FIG. 10, the discharging timing pulse generator 54 of the second embodiment is provided with an adjusting time calculating part 71, a discharging time calculating part 72 and a pulse generator 73.

The adjusting time calculating part 71 calculates an adjusting time delay based on position information inputted from the position counter 52, in a similar manner as the adjusting time calculating part 61.

Every time the period counter 53 inputs time information to the discharging time calculating part 72, the discharging time calculating part 72 uses a time indicated by the inputted time information (namely, a predicted time Te) and the adjusting time delay inputted from the adjusting time calculating part 71 so as to calculate a N-th discharging time ET_N of a N-th discharging timing pulse with Formula 4.

$$ET\_N = (N-1) \times Te/M + \text{delay} \qquad \text{<Formula 4>}$$

After a predetermined delay time Td elapses since the input of the edge detection signal, the pulse generator 73 generates and outputs a first discharging timing pulse. Further, after the N-th discharging time ET_N elapses since the pulse generator 73 has output the first discharging timing pulse, the pulse generator 73 generates and outputs the N-th discharging timing pulse. The "N" here is an integer in a range of 2 (two) to M.

The recording encoder processing part 31 configured in such a manner is provided with a position counter 52, the adjusting time calculating part 71 and the discharging time calculating part 72.

The adjusting time calculating part 71 is configured to calculate, based on the carriage position calculated by the position counter 52, first to fifth adjusting times d1 to d5 each of which is previously set so that the value thereof periodically changes with respect to the carriage position.

The discharging time calculating part 72 is configured to determine an output timing at which the discharging timing pulse is to be output, by delaying or advancing, based on the first to fifth adjusting times d1 to d5 calculated by the adjusting time calculating part 71, the output timing with respect to a reference output timing which is calculated based on an encoder signal of the rotary encoder 14 and which becomes to be a reference for the output timing. The reference output timing is a timing specified by: $(N-1) \times Te/M$.

Since the recording encoder processing part 31 configured in such a manner is capable of suppressing the generation of a periodic printing unevenness in a case that the discharging timing pulse, indicating the discharging timing at which the recording head 11 that is moved by the carriage 12 driven by the carriage motor 13 discharges the ink toward the sheet, thereby making it possible to improve the quality of the image of the image forming apparatus 1.

Each of the first to fifth adjusting times d1 to d5 is set as a function in which the carriage position X is a variable.

Each of the first to fifth adjusting times d1 to d5 is configured to be capable of setting, for each of the image forming apparatuses 1 each having the recording encoder processing part 31 mounted thereon, a value of each of the first to fifth adjusting times d1 to d5 in a case that the carriage 12 is positioned at one of the initial positions Xs1 to Xs5 which are previously set. With this, the recording encoder processing part 31 is capable of calculating the first to fifth adjusting times d1 to d5 which are appropriate for each of the image forming apparatuses 1.

The discharging time calculating part 72 is configured to determine the output timing by delaying or advancing the output timing based on the adjusting time delay which is calculated by linearly coupling of the first to fifth adjusting times d1 to d5. The recording encoder processing part 31 configured in such a manner is capable of suppressing the generation of the printing unevenness due to a plurality of periodic fluctuations, thereby making it possible to improve the quality of the image of the image forming apparatus 1.

The recording encoder processing part 31 is configured to set at least one of the coefficients a1 to a5 to be 0 (zero) so that the recording encoder processing part 31 is capable of selecting adjusting times, of the first to fifth adjusting times d1 to d5, which are linearly coupled. The recording encoder processing part 31 configured in such a manner is capable of selecting adjusting times, of the first to fifth adjusting times d1 to d5, which are linearly coupled and which are necessary for suppressing the periodic printing unevenness.

The period P1 of the first adjusting time d1 corresponds to the distance by which the carriage 12 is moved by one rotation of the carriage motor 13. The recording encoder processing part 31 configured in such a manner is capable of suppressing the generation of a printing unevenness corresponding to the rotational period of the carriage motor 13.

The period P2 of the second adjusting time d2 corresponds to the cogging period of the carriage motor 13 which drives the carriage 12. The recording encoder processing part 31 configured in such a manner is capable of suppressing the generation of a printing unevenness due to the cogging of the carriage motor 13.

In the second embodiment as described above, the adjusting time calculating part 71 corresponds to the "adjusting time calculating part" and the discharging time calculating part 72 corresponds to the "timing correcting part".

Third Embodiment

In the following, a third embodiment of the present disclosure will be explained, together with the drawing.

In the third embodiment, the configuration of the printing mechanism 15 of the image forming apparatus 1 of the first embodiment will be explained in detail.

Figure 11:
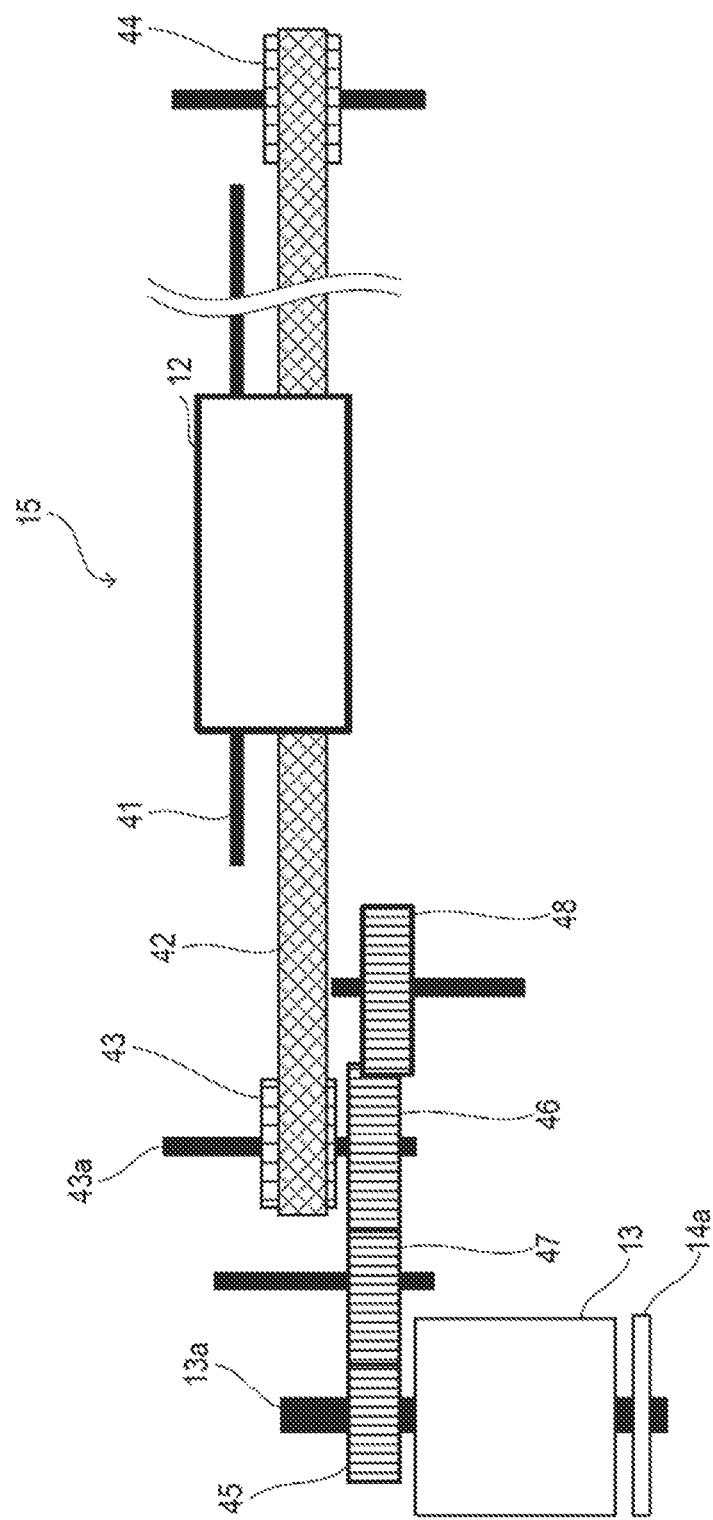
FIG. 11 is a view indicating an arrangement position of an encoder disc.

As depicted in FIG. 11, the printing mechanism 15 is provided with gears 45, 46, 47 and 48, in addition to the guide shaft 41, the endless belt 42, the driving pulley 43 and the driven pulley 44 which are described above.

The gear 45 is attached to a rotation shaft 13a of the carriage motor 13. The gear 46 is attached to the rotation shaft 13a of the carriage motor 13 so as to face the gear 45.

The gear 47 is provided between the gear 45 and the gear 46 and meshes with the gears 45 and 46.

Accordingly, a rotational driving force of the carriage motor 13 is transmitted to the driving pulley 43 via the gears 45, 46 and 47 so as to cause the driving pully 43 to rotate, thereby rotating the endless belt 42 together with the driving pulley 43 and to cause the carriage 12 to move along the guide shaft 41.

The gear 48 is provided on a side opposite to the gear 47, with the gear 46 being interposed between the gear 46 and gear 47, and meshes with the gear 46.

An encoder disc 14a of the rotary encoder 14 is attached to the rotation shaft 13a of the carriage motor 13. Accordingly, the rotary encoder 14 outputs an encoder signal every time the carriage motor 13 rotates by a predetermined amount.

The recording encoder processing part 31 configured in such a manner generates the discharging timing pulse based on the encoder signal obtained from the rotary encoder 14 configured to output the encoder signal every time the rotary encoder 14 detects a displacement of the predetermined displacement amount, by the detection object, which is previously set, with each of the carriage motor 13, the driving pulley 43 and the gears 45, 46, 47 and 48 as the detection object, each of the carriage motor 13, the driving pulley 43 and the gears 45, 46, 47 and 48 being configured to transmit the driving force to the endless belt 42 which is configured to transmit the driving force to the carriage 12 and to move the carriage 12. The rotary encoder 14 is configured to output the encoder signal by detecting the rotation of the carriage motor 13 as the displacement of the detection object.

Further, the recording encoder processing part 31 generates the discharging timing pulse based on the encoder signal obtained from the rotary encoder 14 configured to output the encoder signal every time the rotary encoder 14 detects a displacement of the predetermined displacement amount, by the detection object, which is previously set, with the carriage motor 13 as the detection object, the carriage motor 13 being configured to transmit the driving force to a driving object capable of moving (movable) in a moving direction along the main scanning direction as the detection object.

Note that as described above, the carriage motor rotation speed fluctuates or oscillates at the cogging period due to the cogging, with the reference rotation speed as the center of fluctuation. Further, the moving speed of the carriage 12 does not fluctuate or oscillate at the cogging period, and the carriage 12 moves at the constant speed and at the reference speed. Due to this, a variation cycle of the displacement of the carriage motor 13 is different from a variation cycle of the displacement of the carriage 12.

The recording encoder processing part 31 is provided with the position counter 52, the adjusting time calculating part 61 and the discharging time calculating part 62.

In a case that such a recording encoder processing part 31 generates the discharging timing pulse indicating the discharging timing at which the recording head 11, which is moved by the carriage 12 driven by the carriage motor 13, discharges the ink toward the sheet, the recording encoder processing part 31 is capable of suppressing the generation of a periodic printing unevenness, thereby making it possible to improve the quality of the image of the image forming apparatus 1.

In the third embodiment explained in the foregoing, the endless belt 42 corresponds to a "first transmitting member", the carriage motor 13, the driving pulley 43 and the gears 45, 46, 47 and 48 each correspond to a "second transmitting member", the main scanning direction corresponds to a "predetermined direction", and the carriage motor 13 corresponds to a "rotating body".

Fourth Embodiment

In the following, a fourth embodiment of the present disclosure will be explained, together with the drawing.

In the fourth embodiment, the configuration of the printing mechanism 15 of the image forming apparatus 1 of the second embodiment will be explained in detail.

As depicted in FIG. 11, the printing mechanism 15 is provided with gears 45, 46, 47 and 48, in addition to the guide shaft 41, the endless belt 42, the driving pulley 43 and the driven pulley 44 which are described above.

Since the gears 45, 46, 47 and 48 of the fourth embodiment are same as those in the third embodiment, any explanation therefor will be omitted.

An encoder disc 14a of the rotary encoder 14 is attached to the rotation shaft 13a of the carriage motor 13, similarly to the third embodiment. Accordingly, the rotary encoder 14 outputs an encoder signal every time the carriage motor 13 rotates by a predetermined amount.

The recording encoder processing part 31 configured in such a manner generates the discharging timing pulse based on the encoder signal obtained from the rotary encoder 14 configured to output the encoder signal every time the rotary encoder 14 detects a displacement of the predetermined displacement amount, by the detection object, which is previously set, with each of the carriage motor 13, the driving pulley 43 and the gears 45, 46, 47 and 48 as the detection object, each of the carriage motor 13, the driving pulley 43 and the gears 45, 46, 47 and 48 being configured to transmit the driving force to the endless belt 42 which is configured to transmit the driving force to the carriage 12 and to move the carriage 12.

Further, the recording encoder processing part 31 generates the discharging timing pulse based on the encoder signal obtained from the rotary encoder 14 configured to output the encoder signal every time the rotary encoder 14 detects a displacement of the predetermined displacement amount, by the detection object, which is previously set, with the carriage motor 13 as the detection object, the carriage motor 13 being configured to transmit the driving force to the carriage 13 capable of moving in a moving direction along a predetermined direction.

Note that as described above, the carriage motor rotation speed fluctuates or oscillates at the cogging period due to the cogging, with the reference rotation speed as the center of fluctuation. Further, the moving speed of the carriage 12 does not fluctuate or oscillate at the cogging period, and the carriage 12 moves at the constant speed and at the reference speed. Due to this, a variation cycle of the displacement of the carriage motor 13 is different from a variation cycle of the displacement of the carriage 12.

The recording encoder processing part 31 is provided with the position counter 52, the adjusting time calculating part 71 and the discharging time calculating part 72.

In a case that such a recording encoder processing part 31 generates the discharging timing pulse indicating the discharging timing at which the recording head 11, which is moved by the carriage 12 driven by the carriage motor 13, discharges the ink toward the sheet, the recording encoder processing part 31 is capable of suppressing the generation of a periodic printing unevenness, thereby making it possible to improve the quality of the image of the image forming apparatus 1.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

[First Modification]

The above-described embodiments each indicate an aspect wherein the time information is a clock number required for the carriage motor 13 to make the rotation by a predetermined amount. It is allowable, however, that the time information is information indicating a time required for the carriage motor 13 to make the rotation by the predetermined amount.

[Second Modification]

The above-described embodiments each indicate an aspect wherein each of the first to fifth adjusting times di to d5 is represented by the sine function. It is allowable, however, that each of the first to fifth adjusting times di to d5 is represented by a trigonometric function different from the sine function (for example, cosine function).

[Third Modification]

Figure 12:
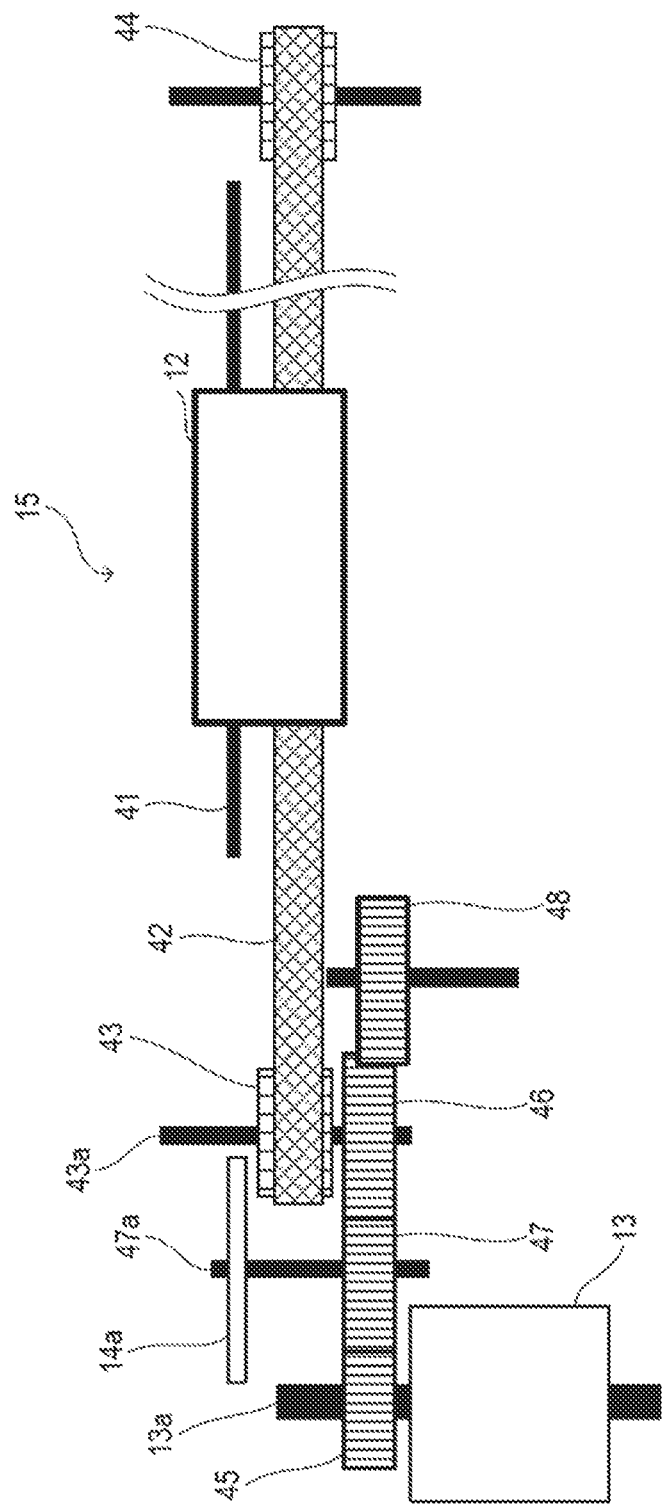
FIG. 12 is a view indicating an arrangement position of an encoder disc attached to a rotation shaft of a gear.

The third and fourth embodiments as described above each indicate an aspect wherein the encoder disc 14a is attached to the rotation shaft 13a of the carriage motor 13. It is allowable, however, that the encoder disc 14a is attached to a rotation shaft 47a of the gear 47, as depicted in FIG. 12. Alternatively, it is allowable that the encoder disc 14a is attached to the gear 47. With this, the rotary encoder 14 outputs the encoder signal every time the gear 47 rotates by a predetermined rotation amount. The gear 47 corresponds to the "rotating body".

[Fourth Modification]

Figure 13:
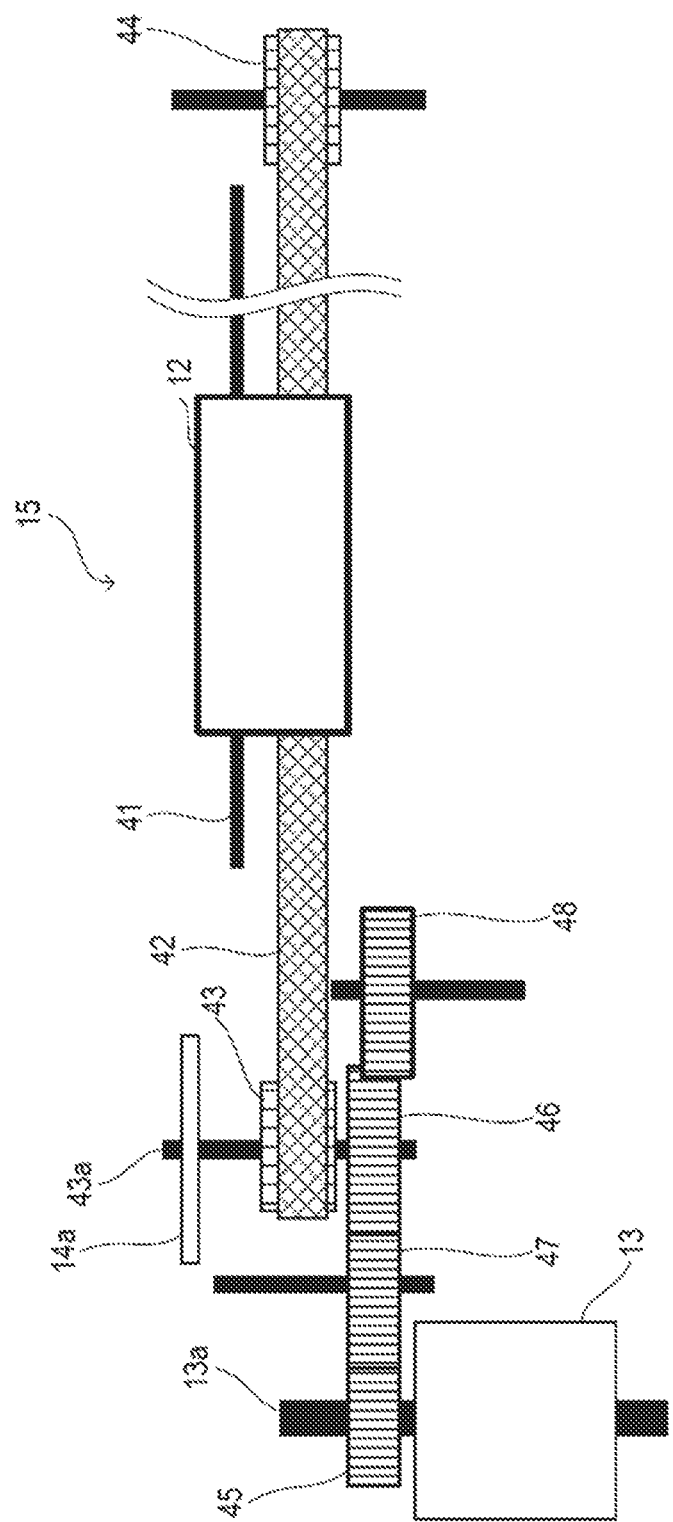
FIG. 13 is a view indicating an arrangement position of an encoder disc attached to a rotation shaft of a driving pulley.

The third and fourth embodiments as described above each indicate an aspect wherein the encoder disc 14a is attached to the rotation shaft 13a of the carriage motor 13. It is allowable, however, that the encoder disc 14a is attached to a rotation shaft 43a of the driving pulley 43, as depicted in FIG. 13. Alternatively, it is allowable that the encoder disc 14a is attached to the driving pulley 43. With this, the rotary encoder 14 outputs the encoder signal every time the driving pulley 43 rotates by a predetermined rotation amount. The driving pulley 43 corresponds to the "rotating body".

[Fifth Modification]

Figure 14:
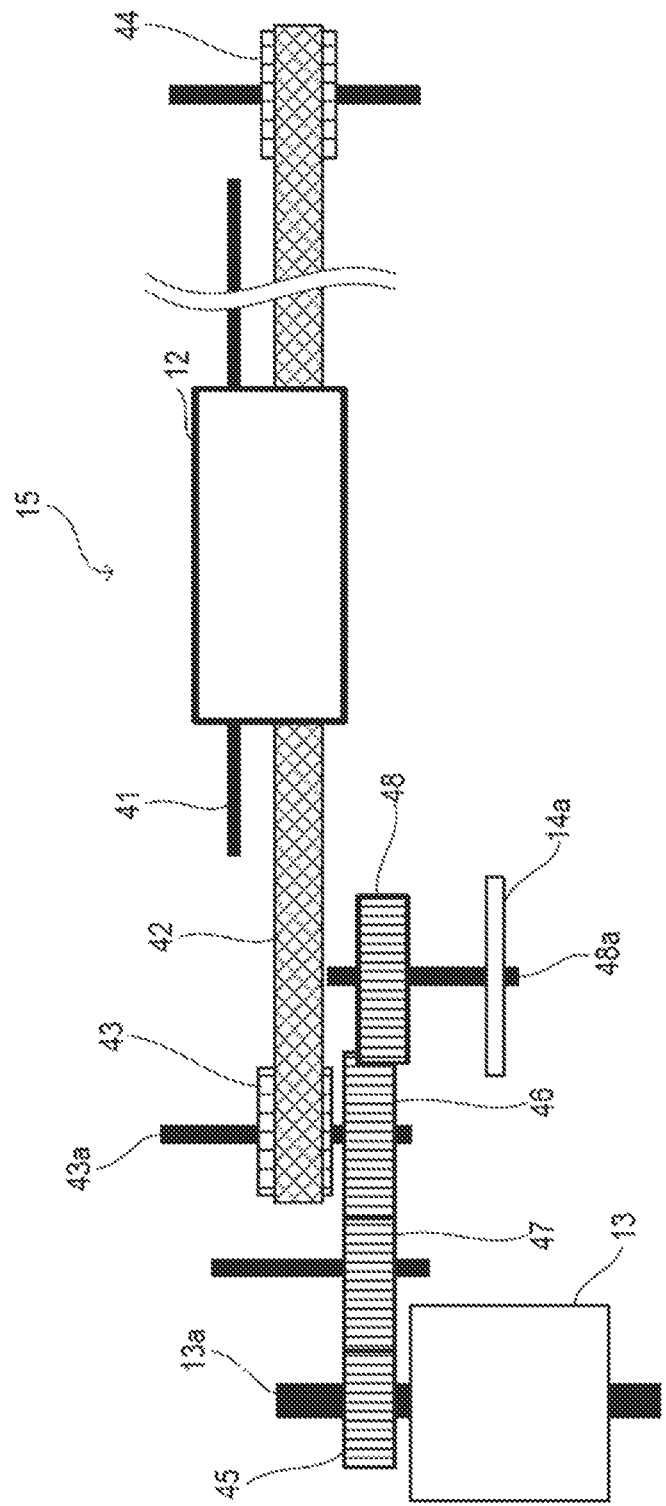
FIG. 14 is a view indicating an arrangement position of an encoder disc attached to a position which is away from a driving force transmitting path.

The third and fourth embodiments as described above each indicate an aspect wherein the encoder disc 14a is attached to the rotation shaft 13a of the carriage motor 13. It is allowable, however, that the encoder disc 14a is attached to a rotation shaft 48a of the gear 48, as depicted in FIG. 14. Namely, the encoder disc 14a is attached to the rotation shaft 48a of the gear 48 which is arranged at a position which is away from a driving force transmitting path in which the driving force is transmitted from the carriage motor 13 to the carriage 12. The gear 48 corresponds to the "rotating body", and the rotation shaft 48a of the gear 48 corresponds to a "shaft of the rotating body".

It is allowable that a plurality of functions possessed by one constituent component in the above-described embodiment(s) is realized by a plurality of constituent components, or that one function possessed by one constituent component is realized by a plurality of constituent components. Alternatively, it is also allowable that a plurality of functions possessed by a plurality of constituent components is realized by one constituent component, or that one function realized by a plurality of constituent components is realized by one constituent component. Further, it is also allowable that a part of the configuration of the above-described embodiment(s) may be omitted. Furthermore, it is also allowable that at least a part of the configuration of the above-described embodiment is added to or replaced with respect to another configuration of the above-described embodiment.

In the foregoing explanation, the recording controller 16, the carriage motor controller 17, the line feed motor controller 23 and the encoder processing part 30 are described as mutually independent constituent components. It is allowable, however, for example that a controller having the CPU2, the ROM 3, the RAM 4 realizes the functions, respectively, of the recording controller 16, the carriage motor controller 17, the line feed motor controller 23 and the encoder processing part 30.

Other than the recording encoder processing part 31 as described above, the present disclosure may be realized by a variety of kinds of aspects such as, for example, a system having the recording encoder processing part 31 as a constituent component thereof, a program for causing a computer to function as the recording encoder processing part 31, a non-transition physical recording medium such as a semiconductor memory storing the program, etc., a pulse-generating method, etc.

Parts or all of the embodiment and Examples described above can be also described as in the following addenda. However, the present disclosure is not limited to the following addenda.

<Addendum 1>

A pulse generator configured to generate a timing pulse based on a detection signal obtained from a detection signal outputting part configured to output the detection signal every time the detection signal outputting part detects a displacement of a predetermined displacement amount, by a detection object, which is previously set, with a second transmitting member as the detection object, the second transmitting member being configured to transmit a driving force to a first transmitting member which is configured to transmit the driving force to a driving object and to move the driving object, the pulse generator comprising: a position calculating part configured to calculate a driving object position, which is a position of the driving object, based on the detection signal of the detection signal outputting part; an adjusting amount calculating part configured to calculate, based on the driving object position calculated by the position calculating part, at least one adjusting amount previously set so that a value of the at least one adjusting amount is periodically changed with respect to the driving object position; and a timing correcting part configured to determine an output timing, at which the timing pulse is to be output, by correcting the output timing based on the at least one adjusting amount calculated by the adjusting amount outputting part.

<Addendum 2>

The pulse generator according to Addendum 1, wherein the detection object is a rotating body, and the detection signal outputting part is configured to output the detection signal by detecting a rotation of the rotating body as the displacement of the detection object.

<Addendum 3>

The pulse generator according to Addendum 1, wherein a variation cycle of the displacement of the detection object is different from a variation cycle of a displacement of the driving object.

<Addendum 4>

The pulse generator according to Addendum 1, wherein the second transmitting member as the detection object includes a motor, and the detection signal outputting part is an encoder provided with an encoder disc attached to a rotation shaft of the motor.

<Addendum 5>

The pulse generator according to Addendum 1, wherein the first transmitting member is an endless belt provided along a moving direction of the driving object, the second transmitting member includes a driving pulley provided on an end of the endless belt and a gear configured to transmit the driving force to the driving pulley, and the detection signal outputting part is an encoder provided with an encoder disc attached to the gear or to a rotation shaft of the gear.

<Addendum 6>

The pulse generator according to Addendum 1, wherein the first transmitting member is an endless belt provided along a moving direction of the driving object, the second transmitting member includes a driving pulley provided on an end of the endless belt, and the detection signal outputting part is an encoder provided with an encoder disc attached to the driving pulley or to a rotation shaft of the driving pulley.

<Addendum 7>

The pulse generator according to Addendum 1, wherein the detection signal outputting part is an encoder provided with an encoder disc attached to a shaft of a rotating body arranged at a position which is away from a driving force transmitting path in which the driving force is transmitted from a driving source to the driving object.

<Addendum 8>

The pulse generator according to Addendum 1, wherein the at least one adjusting amount is set as a function in which the driving object position is a variable.

<Addendum 9>

The pulse generator according to Addendum 1, wherein the at least one adjusting amount is configured so that a value, of the at least one adjusting amount, in a case that the driving object is positioned at a previously set initial position is to be set for each of apparatuses having the pulse generator mounted on the apparatuses.

<Addendum 10>

The pulse generator according to Addendum 1, wherein the at least one adjusting amount is a plurality of adjusting amounts, and the timing correcting part is configured to determine the output timing by correcting the output timing based on a coupled adjusting amount calculated by linearly coupling of the plurality of adjusting amounts.

<Addendum 11>

The pulse generator according to Addendum 10, wherein the pulse generator is configured to select adjusting amounts, of the plurality of adjusting amounts, which are linearly coupled.

<Addendum 12>

The pulse generator according to Addendum 8, wherein the function is a trigonometric function.

<Addendum 13>

The pulse generator according to Addendum 1, wherein a period of the at least one adjusting amount is a driving amount required for a motor, which is configured to generate the driving force to be transmitted to the driving object, to make one rotation.

<Addendum 14>

The pulse generator according to Addendum 1, wherein a period of the at least one adjusting amount is a cogging period of a motor which is configured to generate the driving force to be transmitted to the driving object.

What is claimed is:

1. A pulse generator configured to generate a timing pulse based on a detection signal obtained from a detection signal outputting part configured to output the detection signal every time the detection signal outputting part detects a displacement of a predetermined displacement amount, by a detection object, which is previously set, with a second transmitting member as the detection object, the second transmitting member being configured to transmit a driving force to a first transmitting member which is configured to transmit the driving force to a driving object and to move the driving object, the pulse generator comprising:
- a position calculating part configured to calculate a driving object position, which is a position of the driving object, based on the detection signal of the detection signal outputting part;
- an adjusting amount calculating part configured to calculate, based on the driving object position calculated by the position calculating part, at least one adjusting amount previously set so that a value of the at least one adjusting amount is periodically changed with respect to the driving object position; and
- a timing adjusting part configured to determine an output timing, at which the timing pulse is to be output, by delaying or advancing the output timing, based on the at least one adjusting amount calculated by the adjusting amount calculating part, with respect to a reference output timing which is calculated based on the detection signal of the detection signal outputting part and which becomes to be a reference for the output timing.

2. The pulse generator according to claim 1, wherein
the detection object is a rotating body, and
the detection signal outputting part is configured to output the detection signal by detecting a rotation of the rotating body as the displacement of the detection object.

3. The pulse generator according to claim 1, wherein
a variation cycle of the displacement of the detection object is different from a variation cycle of a displacement of the driving object.

4. The pulse generator according to claim 1, wherein
the second transmitting member as the detection object includes a motor, and
the detection signal outputting part is an encoder provided with an encoder disc attached to a rotation shaft of the motor.

5. The pulse generator according to claim 1, wherein
the first transmitting member is an endless belt provided along a moving direction of the driving object, and
the second transmitting member includes a driving pulley provided on an end of the endless belt and a gear configured to transmit the driving force to the driving pulley, and
the detection signal outputting part is an encoder provided with an encoder disc attached to the gear or to a rotation shaft of the gear.

6. The pulse generator according to claim 1, wherein
the first transmitting member is an endless belt provided along a moving direction of the driving object,
the second transmitting member includes a driving pulley provided on an end of the endless belt, and
the detection signal outputting part is an encoder provided with an encoder disc attached to the driving pulley or to a rotation shaft of the driving pulley.

7. The pulse generator according to claim 1, wherein
the detection signal outputting part is an encoder provided with an encoder disc attached to a shaft of a rotating body arranged at a position which is away from a driving force transmitting path in which the driving force is transmitted from a driving source to the driving object.

8. The pulse generator according to claim 1, wherein
the at least one adjusting amount is set as a function in which the driving object position is a variable.

9. The pulse generator according to claim 1, wherein
the at least one adjusting amount is configured so that a value, of the at least one adjusting amount, in a case that the driving object is positioned at a previously set initial position is settable for each of apparatuses having the pulse generator mounted thereon.

10. The pulse generator according to claim 1, wherein
the at least one adjusting amount is a plurality of adjusting amounts, and
the timing adjusting part is configured to determine the output timing by delaying or advancing the output timing based on a coupled adjusting amount calculated by linearly coupling of the plurality of adjusting amounts.

11. The pulse generator according to claim 10, wherein
the pulse generator is configured to select adjust amounts, of the plurality of adjusting amounts, which are linearly coupled.

12. The pulse generator according to claim 8, wherein
the function is a trigonometric function.

13. The pulse generator according to claim 1, wherein
a period of the at least one adjusting amount is a driving amount required for a motor, which is configured to generate the driving force to be transmitted to the driving object, to make one rotation.

14. The pulse generator according to claim 1, wherein
a period of the at least one adjusting amount is a cogging period of a motor which is configured to generate the driving force to be transmitted to the driving object.

15. A pulse generator configured to generate a timing pulse based on a detection signal obtained from a detection signal outputting part configured to output the detection signal every time the detection signal outputting part detects a displacement of a predetermined displacement amount, by a detection object, which is previously set, with a second transmitting member as the detection object, the second transmitting member being configured to transmit a driving force to a first transmitting member which is configured to transmit the driving force to a driving object and to move the driving object, the pulse generator comprising:
- a position calculating part configured to calculate a driving object position, which is a position of the driving object, based on the detection signal of the detection signal outputting part;
- an adjusting amount calculating part configured to calculate, based on the driving object position calculated by the position calculating part, at least one adjusting amount previously set so that a value of the at least one adjusting amount is periodically changed with respect to the driving object position; and
- a timing correcting part configured to determine an output timing, at which the timing pulse is to be output, by correcting the output timing based on the at least one adjusting amount calculated by the adjusting amount calculating part.

16. The pulse generator according to claim 1, wherein
the driving object is a conveying apparatus which is configured to move a discharging apparatus configured to discharge an ink toward a sheet, and
the timing pulse indicates a timing at which the ink is discharged by the discharging apparatus.

17. A pulse generator configured to generate a timing pulse based on a detection signal obtained from a detection signal outputting part configured to output the detection signal every time the detection signal outputting part detects a displacement of a predetermined displacement amount, by a detection object, which is previously set, with a rotating body, which is configured to transmit a driving force to a driving object configured to be movable in a moving direction along a predetermined direction, as the detection object, the pulse generator comprising:
- a position calculating part configured to calculate a driving object position, which is a position of the driving object, based on the detection signal of the detection signal outputting part;
- an adjusting amount calculating part configured to calculate, based on the driving object position calculated by the position calculating part, at least one adjusting amount previously set so that a value of the at least one adjusting amount is periodically changed with respect to the driving object position; and
- a timing adjusting part configured to determine an output timing, at which the timing pulse is to be output, by delaying or advancing the output timing, based on the at least one adjusting amount calculated by the adjusting amount calculating part, with respect to a reference output timing which is calculated based on the detection signal of the detection signal outputting part and which becomes to be a reference for the output timing.

18. The pulse generator according to claim 17, wherein a variation cycle of the displacement of the detection object is different from a variation cycle of a displacement of the driving object.

19. The pulse generator according to claim 17, wherein the rotating body as the detection object includes a motor, and
the detection signal outputting part is an encoder provided with an encoder disc attached to a rotation shaft of the motor.

20. The pulse generator according to claim 17, wherein the rotating body as the detection object is a gear configured to transmit the driving force to a driving pulley provided on an end of an endless belt provided along a moving direction of the driving object, and
the detection signal outputting part is an encoder provided with an encoder disc attached to the gear or to a rotation shaft of the gear.

21. The pulse generator according to claim 17, wherein the rotating body as the detection object is a driving pulley provided on an end of an endless belt provided along a moving direction of the driving object, and
the detection signal outputting part is an encoder provided with an encoder disc attached to the driving pulley or to a rotation shaft of the driving pulley.

22. The pulse generator according to claim 17, wherein the detection signal outputting part is an encoder provided with an encoder disc attached to a shaft of a rotating body arranged at a position which is away from a driving force transmitting path in which the driving force is transmitted from a driving source to the driving object.

23. A pulse generator configured to generate a timing pulse based on a detection signal obtained from a detection signal outputting part configured to output the detection signal every time the detection signal outputting part detects a displacement of a predetermined displacement amount, by a detection object, which is previously set, with a rotating body, which is configured to transmit a driving force to a driving object configured to be movable in a moving direction along a predetermined direction, as the detection object, the pulse generator comprising:
- a position calculating part configured to calculate a driving object position, which is a position of the driving object, based on the detection signal of the detection signal outputting part;
- an adjusting amount calculating part configured to calculate, based on the driving object position calculated by the position calculating part, at least one adjusting amount previously set so that a value of the at least one adjusting amount is periodically changed with respect to the driving object position; and
- a timing correcting part configured to determine an output timing, at which the timing pulse is to be output, by correcting the output timing based on the at least one adjusting amount calculated by the adjusting amount calculating part.

* * * * *